(12) United States Patent
Kim et al.

(10) Patent No.: US 9,392,300 B2
(45) Date of Patent: Jul. 12, 2016

(54) METHOD AND APPARATUS FOR ENCODING A MOTION VECTOR, AND METHOD AND APPARATUS FOR ENCODING/DECODING IMAGE USING SAME

(71) Applicant: SK TELECOM CO., LTD., Seoul (KR)

(72) Inventors: Hayoon Kim, Seongnam-si (KR); Joohee Moon, Seoul (KR); Yunglyul Lee, Seoul (KR); Haekwang Kim, Seoul (KR); Byeungwoo Jeon, Seoul (KR); Dongwon Kim, Seoul (KR); Mincheol Park, Bucheon-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/624,039

(22) Filed: Feb. 17, 2015

(65) Prior Publication Data

US 2015/0189311 A1 Jul. 2, 2015

Related U.S. Application Data

(63) Continuation of application No. 13/127,004, filed as application No. PCT/KR2009/006168 on Oct. 23, 2009, now Pat. No. 8,976,863.

(30) Foreign Application Priority Data

Oct. 31, 2008 (KR) ........................ 10-2008-0107585

(51) Int. Cl.
*H04B 1/66* (2006.01)
*H04N 7/12* (2006.01)
(Continued)

(52) U.S. Cl.
CPC ............. *H04N 19/56* (2014.11); *H04N 19/176* (2014.11); *H04N 19/44* (2014.11); *H04N 19/517* (2014.11); *H04N 19/52* (2014.11); *H04N 19/521* (2014.11); *H04N 19/61* (2014.11)

(58) Field of Classification Search
None
See application file for complete search history.

(56) References Cited

U.S. PATENT DOCUMENTS 5,819,213 A 10/1998 Oshikiri et al.
5,978,030 A * 11/1999 Jung ..................... H04N 19/54
348/699

(Continued)

FOREIGN PATENT DOCUMENTS

CN 1441594 A 9/2003
CN 1585487 A 2/2005

(Continued)

OTHER PUBLICATIONS

International Search Report mailed Jun. 14, 2010 for PCT/KR2009/006168, citing the above references.

*Primary Examiner* — Frederick Bailey
*Assistant Examiner* — Talha M Nawaz
(74) *Attorney, Agent, or Firm* — Hauptman Ham, LLP

(57) ABSTRACT

An apparatus for decoding a current motion vector of a current block in a current frame from a bitstream, includes: a differential motion vector decoder to reconstruct a differential motion vector by decoding an encoded differential motion vector included in the bitstream; and a motion vector reconstructor to select one or more motion vector prediction candidates to predict the current motion vector, determine a predicted motion vector among the one or more motion vector prediction candidates, and reconstruct the current motion vector of the current block by adding the predicted motion vector to the differential motion vector.

14 Claims, 13 Drawing Sheets

(51) Int. Cl.
*H04N 11/02* (2006.01)
*H04N 11/04* (2006.01)
*H04N 19/56* (2014.01)
*H04N 19/52* (2014.01)
*H04N 19/61* (2014.01)
*H04N 19/517* (2014.01)
*H04N 19/44* (2014.01)
*H04N 19/513* (2014.01)
*H04N 19/176* (2014.01)

(56) References Cited

U.S. PATENT DOCUMENTS

| | | | |
|---|---|---|---|
| 6,289,049 B1 * | 9/2001 | Kim | H04N 19/517 |
| | | | 375/240.16 |
| 6,377,623 B1 * | 4/2002 | Ra | H04N 19/53 |
| | | | 348/E5.066 |
| 6,733,623 B2 | 5/2004 | Wu et al. | |
| 6,990,148 B2 | 1/2006 | Yang | |
| 7,295,612 B2 | 11/2007 | Haskell et al. | |
| 7,590,179 B2 | 9/2009 | Mukerjee | |
| 7,606,311 B2 | 10/2009 | Hsu et al. | |
| 7,672,541 B2 | 3/2010 | Gasparri et al. | |
| 7,680,185 B2 | 3/2010 | Mukerjee et al. | |
| 7,809,061 B1 | 10/2010 | Sarna | |
| 7,856,059 B2 | 12/2010 | Haskell et al. | |
| 8,064,520 B2 | 11/2011 | Mukerjee et al. | |
| 8,116,527 B2 | 2/2012 | Sabol | |
| 8,265,160 B2 | 9/2012 | Al-Kadi et al. | |
| 8,279,931 B2 | 10/2012 | Peng et al. | |
| 8,451,898 B2 | 5/2013 | Saigo et al. | |
| 8,625,669 B2 | 1/2014 | Holcomb | |
| 8,654,855 B2 * | 2/2014 | Kim | H04N 19/52 |
| | | | 375/240.03 |
| 2003/0161403 A1 | 8/2003 | Yang | |
| 2005/0053297 A1 | 3/2005 | Mukerjee et al. | |
| 2006/0098737 A1 | 5/2006 | Sethuraman et al. | |
| 2008/0043848 A1 | 2/2008 | Kuhn | |
| 2008/0107181 A1 | 5/2008 | Han et al. | |
| 2008/0181298 A1 | 7/2008 | Shi et al. | |
| 2009/0304293 A1 | 12/2009 | Chang et al. | |
| 2010/0020886 A1 | 1/2010 | Raveendran et al. | |
| 2010/0328538 A1 | 12/2010 | Al-Kadi et al. | |
| 2011/0001831 A1 | 1/2011 | Noguchi | |
| 2012/0082229 A1 * | 4/2012 | Su | H04N 19/52 |
| | | | 375/240.16 |
| 2012/0128060 A1 * | 5/2012 | Lin | H04N 19/00696 |
| | | | 375/240.02 |
| 2013/0070854 A1 | 3/2013 | Wang et al. | |
| 2014/0126643 A1 | 5/2014 | Park et al. | |
| 2015/0098508 A1 * | 4/2015 | Yie | H04N 19/597 |
| | | | 375/240.16 |

FOREIGN PATENT DOCUMENTS

| | | |
|---|---|---|
| KR | 10-0181034 B1 | 5/1999 |
| KR | 10-244291 B1 | 2/2000 |
| KR | 10-0275694 B1 | 12/2000 |
| WO | 2008056934 A1 | 5/2008 |
| WO | 2008082158 A1 | 7/2008 |

* cited by examiner

FIG. 10

| ⑤ | ⑤ | ④ | ④ | ④ | ③ | ③ | ② | ③ | ③ | ③ | ③ | ② | ① | ② | ② | ② | ③ | ③ | ④ | ④ | ④ | ③ | ③ | ② | ① | ② | ③ | ③ | ④ | ④ | ⑤ |
|---|---|---|---|---|---|---|---|---|---|---|---|---|---|---|---|---|---|---|---|---|---|---|---|---|---|---|---|---|---|---|---|
| -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |

FIG. 11

| N | 2 | 3 | 4 | 5 | 6 | 7 | 8 | 9 | ... |
|---|---|---|---|---|---|---|---|---|---|
| MVp_cand[0] | 1 | 1 | 00 | 1 | 000 | 000 | 000 | 1 | |
| MVp_cand[1] | 0 | 00 | 01 | 000 | 001 | 001 | 001 | 0000 | |
| MVp_cand[2] | | 01 | 10 | 001 | 010 | 010 | 010 | 0001 | |
| MVp_cand[3] | | | 11 | 010 | 011 | 011 | 011 | 0010 | |
| MVp_cand[4] | | | | 011 | 100 | 100 | 100 | 0011 | |
| MVp_cand[5] | | | | | 101 | 101 | 101 | 0100 | |
| MVp_cand[6] | | | | | | 110 | 110 | 0101 | |
| MVp_cand[7] | | | | | | | 111 | 0110 | |
| MVp_cand[8] | | | | | | | | 0111 | |
| ... | | | | | | | | | |

METHOD AND APPARATUS FOR ENCODING A MOTION VECTOR, AND METHOD AND APPARATUS FOR ENCODING/DECODING IMAGE USING SAME

CROSS-REFERENCE TO RELATED APPLICATION

The present application is a continuation of U.S. patent application Ser. No. 13/127,004, filed Apr. 29, 2011, which is the National Phase application of International Application No. PCT/KR2009/006168, filed Oct. 23, 2009, which is based on and claims priority to Korean Patent Application No. 10-2008-0107585 filed on Oct. 31, 2008. The disclosures of the above-listed applications are hereby incorporated by reference herein in their entirety.

TECHNICAL FIELD

The present disclosure relates to a method and an apparatus for encoding or decoding a motion vector used for the inter prediction, and encoding or decoding data of an still image or a video by using the encoded or decoded motion vector.

BACKGROUND

The statements in this section merely provide background information related to the present disclosure and may not constitute prior art.

Methods for efficiently compressing an image signal include JPEG, and JPEG-2000 for the still image, and H.261, H.263, MPEG-2, and MPEG-4 for the dynamic image. Further, MPEG-4 AVC (Advanced Video Coding) for providing the more improved compression efficiency was standardized by the ISO (International Standardization Organization) in 2003 while succeeding technologies such as MPEG-2, and MPEG-4, etc.

Data encoding for the video image includes intra prediction encoding and inter prediction encoding. The intra prediction encoding or the inter prediction encoding is an effective method in order to reduce the correlation between data and it is widely used for compressing various types of data. Especially, because a motion vector of a current block determined by estimating movements of a current block to be currently encoded in the inter prediction encoding has a high correlation with motion vectors of adjacent blocks, it is possible to first calculate a predicted value (hereinafter, referred to as a Predicted Motion Vector: PMV) for a motion vector of the current block by using the motion vectors of the adjacent blocks and then encode not the true value of the motion vector of the current block but only a differential value (hereinafter, referred to as a Differential Motion Vector: DMV) with regard to the predicted value. Therefore, it is possible to considerably reduce the amount of bits to be encoded, which improves the encoding efficiency.

That is, according to most of the known image compression standards such as MPEG-4 AVC, in inter prediction encoding, an encoder encodes only the differential motion vector, which is the differential value between the current motion vector and the predicted motion vector determined by estimating movements of the current block in a reference frame reconstructed through previous encoding and decoding, and then transmits the encoded DMV. A decoder predicts the motion vector of the current block by using the motion vectors of the adjacent blocks decoded in advance, and reconstructs the current motion vector by adding the transmitted differential motion vector to the predicted motion vector.

However, the inventor(s) has noted that when the motion vector is encoded in accordance with the known image compression standard described above, if there is no correlation between the predicted motion vector and the current motion vector, the differential motion vector is increased. Therefore, the inventor(s) has experienced that the generated bit amount is increased, and the compression efficiency is decreased. The inventor(s) has also experienced that when the encoder additionally encodes information of the predicted motion vector in order to reduce the differential motion vector, a bit amount required for encoding additional information is increased, so that the compression efficiency is decreased.

SUMMARY

One aspect of the present disclosure provides an apparatus for encoding a motion vector, including: a prediction candidate selector for selecting one or more motion vector prediction candidates; a predicted motion vector determiner for determining a Predicted Motion Vector (PMV) among the one or more motion vector prediction candidates; and a differential motion vector encoder for calculating a Differential Motion Vector (DMV) by subtracting the predicted motion vector having been determined, from the current motion vector, and encoding the differential motion vector having been calculated.

Another aspect of the present disclosure provides a method for encoding a motion vector, including: selecting one or more motion vector prediction candidates; determining one motion vector prediction candidate among the one or more motion vector prediction candidates as a Predicted Motion Vector (PMV); and decoding a Differential Motion Vector (DMV) after calculating the differential motion vector by subtracting the predicted motion vector having been determined, from a current motion vector.

Yet another aspect of the present disclosure provides an apparatus for decoding a motion vector, including: a differential motion vector decoder for reconstructing a Differential Motion Vector (DMV) by decoding an encoded differential motion vector; and a motion vector reconstructor for determining one motion vector prediction candidate among one or more motion vector prediction candidates as a Predicted Motion Vector (PMV), and reconstructing a current motion vector of a current block by adding the predicted motion vector having been determined to the differential motion vector having been reconstructed.

Yet another aspect of the present disclosure provides a method for decoding a motion vector, including: decoding an encoded Differential Motion Vector (DMV), and reconstructing the encoded differential motion vector having been decoded; and reconstructing a current motion vector of a current block by adding a Predicted Motion Vector (PMV) having been determined to the differential motion vector having been reconstructed after determining one motion vector prediction candidate among one or more motion vector prediction candidates as the predicted motion vector.

Yet another embodiment of the present disclosure provides an apparatus for encoding an image, including: a predictor for determining a current motion vector of a current block and generating a predicted block by using the current motion vector having been determined; a subtractor for generating a residual block by subtracting the predicted block from the current block; a transformer for transforming the residual block; a quantizer for quantizing the residual block having been transformed; and a encoder for encoding the residual block having been quantized, determining one motion vector prediction candidate among one or more motion vector prediction candidates as a Predicted Motion Vector (PMV), encoding a Differential Motion Vector (DMV) obtained by subtracting the predicted motion vector having been determined, from the current motion vector, generating a bit-stream including the residual block having been encoded and the differential motion vector having been encoded, and outputting the bit-stream.

Yet another embodiment of the present disclosure provides a method for encoding an image, including: determining a current motion vector of a current block and generating a predicted block by using the current motion vector having been determined; generating a residual block by subtracting the predicted block from the current block; transforming the residual block; quantizing the residual block having been transformed; encoding the residual block having been quantized; encoding a Differential Motion Vector (DMV) obtained by subtracting a predicted motion vector having been determined, from the current motion vector, after determining one motion vector prediction candidate among one or more motion vector prediction candidates as the Predicted Motion Vector (PMV); and generating a bit-stream including the residual block having been encoded and the differential motion vector having been encoded, and outputting the bit-stream.

Yet another embodiment of the present disclosure provides an apparatus for decoding an image, including: a decoder for reconstructing a residual block and a Differential Motion Vector (DMV) by extracting an encoded residual block and an encoded differential motion vector from a bit-stream and decoding the encoded residual block having been extracted and the encoded differential motion vector having been extracted, determining one motion vector prediction candidate among one or more motion vector prediction candidates as a Predicted Motion Vector (PMV), and reconstructing a current motion vector of a current block by adding the predicted motion vector having been determined to the differential motion vector having been reconstructed; a dequantizer for dequantizing the residual block having been reconstructed; an inverse transformer for inversely transforming the residual block having been dequantized; a predictor for generating a predicted block by using the current motion vector having been reconstructed; and an adder for reconstructing the current block by adding the residual block having been inversely transformed to the predicted block having been generated.

Yet another embodiment of the present disclosure provides a method for decoding an image, including: decoding an encoded residual block having been extracted after extracting the encoded residual block from a bit-stream, and then reconstructing the encoded residual block having been decoded; decoding an encoded Differential Motion Vector (DMV) having been extracted after extracting the encoded differential motion vector from the bit-stream, and then reconstructing the encoded differential motion vector having been decoded; reconstructing a current motion vector of a current block by using a Predicted Motion Vector (PMV) having been selected and the differential motion vector having been reconstructed after selecting one motion vector prediction candidate among one or more motion vector prediction candidates as the predicted motion vector; dequantizing the residual block having been reconstructed; inversely transforming the residual block having been dequantized; generating a predicted block by using the current motion vector having been reconstructed; and adding the residual block having been inversely transformed to the predicted block having been generated, and then reconstructing the current block.

DESCRIPTION OF DRAWINGS

FIG. 10 illustrates an example of a prediction candidate identification flag according to a plurality of thresholds;

FIG. 11 illustrates an example of a transmission bit of the prediction candidate identification flag;

DETAILED DESCRIPTION

Figure 1:
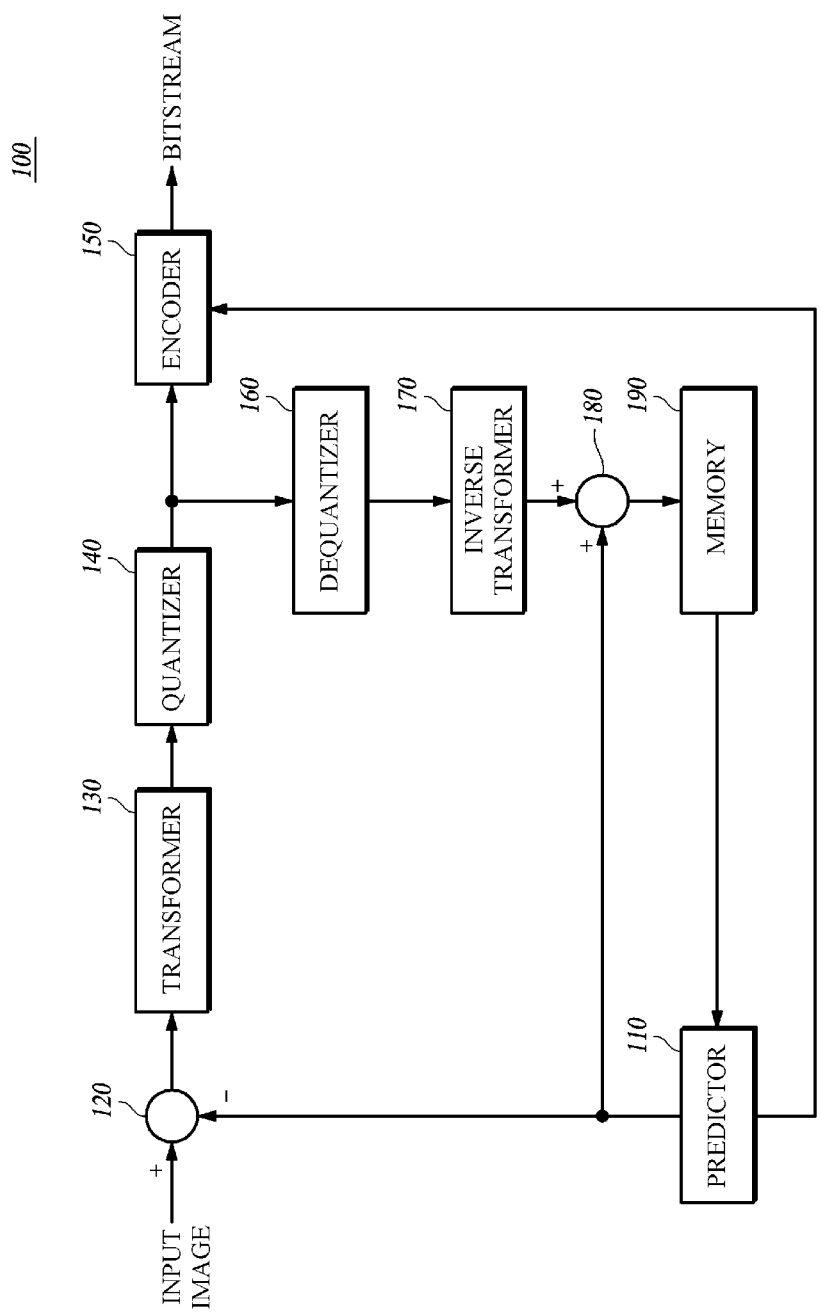
FIG. 1 is a block diagram briefly illustrating a construction of an image encoding apparatus according to an aspect of the present disclosure.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Some embodiments of the present disclosure is related to encoding a motion vector by using a more accurately predicted motion vector while reducing the bit amount for encoding information of the predicted motion vector, thereby improving the compression efficiency. Some embodiments of the present disclosure relates to a method and an apparatus for encoding a motion vector, and a method and an apparatus for encoding/decoding an image using the same. More particularly, the present disclosure relates to a method and an apparatus, which perform an inter prediction by using a pixel reconstructed by encoding and decoding before a block to be currently encoded, efficiently encode or decode the motion vector used for the inter prediction, and encode or decode data of an still image or a video by using the encoded or decoded motion vector.

FIG. 1 is a block diagram briefly illustrating a construction of an image encoding apparatus according to an aspect of the present disclosure.

An image encoding apparatus 100 according to an aspect of the present disclosure may include a predictor 110, a subtractor 120, a transformer 130, a quantizer 140, an encoder 150, a dequantizer 160, an inverse transformer 170, an adder 180, and a memory 190. Here, the dequantizer 160, the inverse transformer 170, the adder 180, and the memory 190 may be selectively included in the image encoding apparatus 100. The image encoding apparatus 100 may include a Personal Computer (PC), a notebook computer, a Personal Digital Assistant (PDA), a Portable Multimedia Play (PMP), a PlayStation Portable (PSP), a mobile communication terminal, etc., and refers to a communication device such as a communication modem for performing communication with various devices or wired-wireless communication networks, various types of programs for encoding an image and a memory for storing data, and a microprocessor for calculating and controlling a program by executing the program.

The predictor 110 determines a current motion vector, which is a motion vector of a current block, and then generates a predicted block by using the determined current motion vector. Specifically, the predictor 110 predicts pixel value of each pixel of the current block to be encoded in an image by using the current motion vector, and generates a predicted block having the predicted pixel value of each predicted pixel. The predictor 110 can determine the current motion vector by using various schemes such as Rate-Distortion Optimization (RDO), etc. The determined current motion vector may be an optimized motion vector.

The subtractor 120 generates a residual block by performing subtraction between the predicted block and the current block. That is, the subtractor 120 generates the residual block having a block-shaped residual signal by calculating a difference between the pixel value of each pixel of the current block to be encoded and the predicted pixel value of each pixel of the predicted block predicted by the predictor 110.

The transformer 130 transforms the residual block. That is, the transformer 130 transforms each of the pixel values of the residual block into a frequency coefficient by transforming the residual signal of the residual block into a frequency domain signal. Here, the transformer 130 can transform the residual signal into the frequency area by using various schemes such as Hadamard Transform, and Discrete Cosine Transform Based Transform (DCT based Transform), which transform an image signal of a spatial axis into an image signal of a frequency axis. The residual signal transformed into the frequency domain signal is the frequency coefficient.

The quantizer 140 quantizes the transformed residual block. That is, the quantizer 140 quantizes the frequency coefficient of the residual block outputted from the transformer 130, and then outputs a residual block having the quantized frequency coefficient. Here, the quantizer 140 can perform the quantization by using Dead Zone Uniform Threshold Quantization (hereinafter, referred to as "DZUTQ"), Quantization Weighted Matrix, or a quantization scheme obtained by improving them.

Meanwhile, the aforementioned image encoding apparatus 100 according to an aspect of the present disclosure includes the transformer 130 and the quantizer 140, but the image encoding apparatus 100 may selectively include the transformer 130 and the quantizer 140. That is, the image encoding apparatus 100 according to an aspect of the present disclosure generates the residual block having the frequency coefficient by transforming the residual signal of the residual block, and may not perform the quantization process. Also, the image encoding apparatus 100 may not transform the residual signal of the residual block into the frequency coefficient, and may perform only the quantization process. Further, the image encoding apparatus 100 may perform neither transformation nor quantization process.

The encoder 150 encodes the quantized residual block, determines a Predicted Motion Vector (PMV) among one or more motion vector prediction candidates, encodes a Differential Motion Vector (DMV) obtained by subtracting the PMV from the current motion vector, generates a bit-stream including the encoded residual block and encoded differential motion vector, and outputs the bit-stream. That is, the encoder 150 generates a quantized frequency coefficient sequence by scanning the quantized frequency coefficient of the residual block outputted from the quantizer 140 according to various schemes such as a zigzag scan shown in FIG. 3 as an example, and encodes the quantized frequency coefficient by using various encoding schemes such as an entropy coding scheme, etc.

Further, the encoder 150 encodes the current motion vector. The encoder 150 selects one or more motion vector prediction candidates, and determines the predicted motion vector among the one or more selected motion vector prediction candidates. For the determination, the encoder 150 can select one or more motion vectors among motion vectors of adjacent blocks of the current block, a motion vector of a colocated (Col) block, which is located at the same place as the current block, in the reference frame, motion vectors of adjacent blocks of the Col block, and an indication vector, which indicates a particular block of the reference frame, in the current block, as one or more motion vector prediction candidates. Here, the particular block may be a block having a motion vector, which levels with the indication vector, or a block having a motion vector, which differs by less than a preset threshold from the indication vector.

Figure 4:
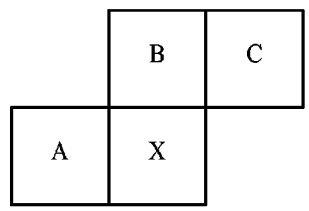
FIG. 4 illustrates an example of adjacent blocks of a current block.

For example, when the encoder 150 determines one motion vector prediction candidate among the one or more motion vector prediction candidates as the predicted motion vector, the encoder 150 may determine the predicted motion vector by using a median value as shown in an example of FIG. 4. Referring to FIG. 4, based on an assumption that the current block is X, a left block of the current block is A, an upper block of the current block is B, an upper right block of the current block is C, a motion vector of the left block A is MV_A, a motion vector of the upper block B is MV_B, and a motion vector of the upper right block C is MV_C, the predicted motion vector of the current block X may be obtained by using the median value as defined by Equation 1.

$$MV\_pred\_X = \mathrm{median}(MV\_A, MV\_B, MV\_C) \qquad \text{[Equation 1]}$$

The encoder 150 can determine the predicted motion vector among the one or more motion vector prediction candidates by using the median value, but it is not necessarily required to use the median value. The encoder 150 can determine the predicted motion vector by using various methods having the priority. The determination will be described later in detail with reference to FIG. 2.

Further, the encoder 150 may generate and encode a prediction candidate identification flag for identifying the motion vector prediction candidate determined as the predicted motion vector, and then additionally include the prediction candidate identification flag in the bit-stream. That is, the bit-stream may include the prediction candidate identification flag as well as the encoded residual block and the encoded differential motion vector.

Moreover, the encoder 150 may independently determine each of an x-component and a y-component of the predicted motion vector. That is, the encoder 150 can determine an x-component of one motion vector prediction candidate among x-components of the one or more motion vector prediction candidates as the x-component of the predicted motion vector, and a y-component of one motion vector prediction candidate among y-components of the one or more motion vector prediction candidates as the y-component of the PMV.

Or, the encoder 150 may obtain a final predicted motion vector by independently determining each of the x-component and the y-component of the final predicted motion vector. That is, the encoder 150 may determine the x-component of the one motion vector prediction candidate among the x-components of the one or more motion vector prediction candidates as the x-component of the predicted motion vector, and the y-component of the one motion vector prediction candidate among the y-components of the one or more motion vector prediction candidates as the y-component of the predicted motion vector.

In addition, when one or more absolute values among absolute values of the x-components of the residual vector and absolute values of the y-components of the residual vector are smaller then or the same as one or more thresholds among a predetermined threshold of the x-components and a predetermined threshold of the y-components, the encoder 150 can generate and encode the prediction candidate identification flag for identifying the determined motion vector prediction candidate among one or more components among the x-components of the predicted motion vector and the y-components of the predicted motion vector, and then additionally include the prediction candidate identification flag in the bit-stream. The encoder 150 will be described in detail with reference to FIG. 2.

The dequantizer 160 dequantizes the residual block quantized by the quantizer 140. The inverse transformer 170 inversely transforms the residual block dequantized by the dequantizer 160. Here, the dequantizer 160 and the inverse transformer 170 can perform the dequantization and the inverse transformation by inversely using the quantization scheme and the transformation scheme used by the quantizer 140 and the transformer 130. Further, when the transformer 130 and the dequantizer 140 perform only the quantization without transformation, only the dequantization may be performed and not the inverse transformation. When neither transformation nor quantization is performed, the dequantizer 160 and the inverse transformer 170 may perform neither inverse transformation nor dequantization or the dequantizer 160 and the inverse transformer 170 may not be included in an image decoding apparatus 1400 and may be omitted.

The adder 180 reconstructs the current block by adding the predicted block predicted in the predictor 110 to the residual block reconstructed by the inverse transformer 170. The memory 190 stores the reconstructed current block outputted from the adder 180 as the reference frame by the unit of the frame, so that the predictor 110 can use the stored current block as the reference frame when the predictor 110 encodes the next block of the current block or other blocks later.

Although not illustrated in FIG. 1, the aforementioned image encoding apparatus 100 according to an aspect of the present disclosure may further include an intra predictor for intra prediction, and a deblocking filter for deblocking filtering the reconstructed current block, based on the H.264/AVC standard. Here, the deblocking filtering refers to an operation for reducing the block distortion generated by encoding the image by the unit of the block. The deblocking filtering can selectively use one method among a method of applying the deblocking filter to both block boundary and macro block boundary or only the macro block boundary, and a method of not using any deblocking filter.

Figure 2:
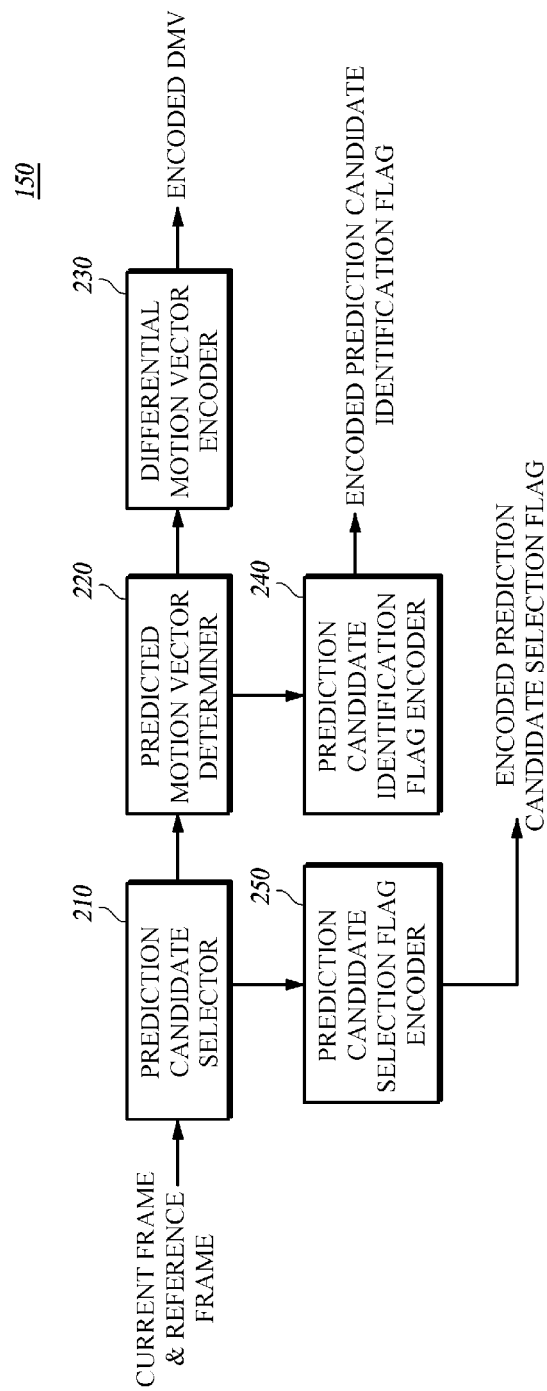
FIG. 2 is a block diagram briefly illustrating a construction of a motion vector encoding apparatus according to an aspect of the present disclosure.

FIG. 2 is a block diagram briefly illustrating a construction of a motion vector encoding apparatus according to an aspect of the present disclosure.

A motion vector encoding apparatus according to an aspect of the present disclosure may be implemented as the encoder 150 of the image encoding apparatus 100 according to an aspect of the present disclosure described through FIG. 1. Hereinafter, for the convenience of description, the motion vector encoding apparatus according to an aspect of the present disclosure is referred to as the encoder 150. Further, the encoder 150 according to an aspect of the present disclosure may further include an image encoder for outputting the encoded residual block by encoding the quantized residual block as described through FIG. 1, but such an image encoder is apparent to those skilled in the art so that the detailed description is omitted.

The encoder 150 according to an aspect of the present disclosure may include a prediction candidate selector 210, a predicted motion vector determiner 220, a differential motion vector encoder 230, a prediction candidate identification flag encoder 240, and a prediction candidate selection flag encoder 250. Here, the encoder 150 does not necessarily need to include one or more prediction candidate identification flag encoder 240 and the prediction candidate selection flag encoder 250, and may selectively include them.

The prediction candidate selector 210 selects one or more motion vector prediction candidates. The predicted motion vector determiner 220 determines one motion vector prediction candidate among one or more motion vector prediction candidates as a predicted motion vector. The differential motion vector encoder 230 calculates and encodes a differential motion vector by subtracting the predicted motion vector from the current motion vector. The prediction candidate identification flag encoder 240 generates and encodes a prediction candidate identification flag for identifying the motion vector prediction candidate determined by the predicted motion vector. The prediction candidate selection flag encoder 250 generates and encodes a prediction candidate selection flag for identifying which motion vector prediction candidate is selected by the prediction candidate selector 210 for every certain area (e.g. a slice in H.264).

The differential motion vector is calculated as defined by Equation 2. In Equation 2, MVd denotes the differential motion vector, MV denotes the current motion vector, and MVp_opt denotes the predicted motion vector.

$$MVd = MV - MVp\_opt \quad \text{[Equation 2]}$$

The differential motion vector encoded by the differential motion vector encoder 230 and the encoded residual block outputted from the aforementioned image encoder may be included in the bit-stream and then transmitted to an image decoding apparatus. Further, the bit-stream may further include one or more combinations of a prediction candidate selection flag encoded in the prediction candidate selection flag encoder 250 and a prediction candidate identification flag encoded in the prediction candidate identification flag encoder 240.

Figures 5, 6:
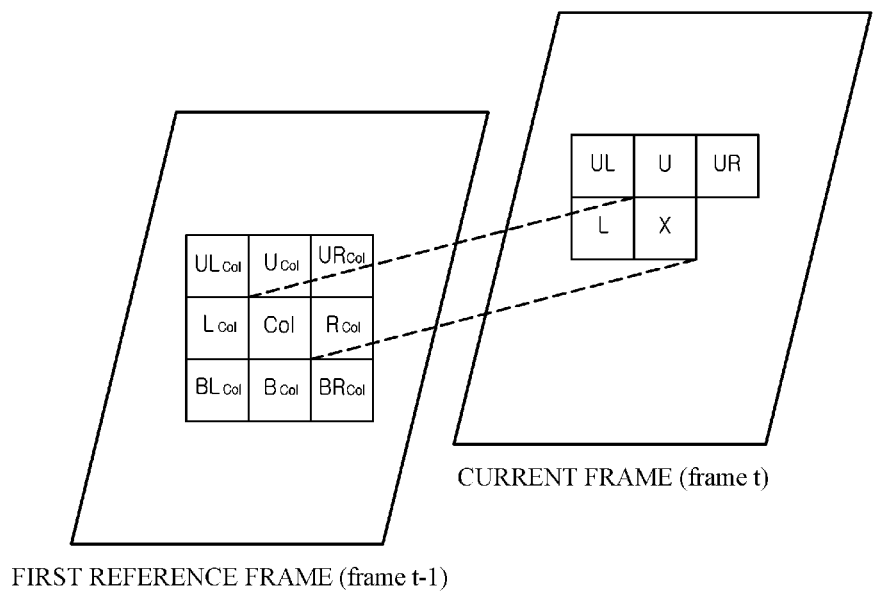
FIG. 5 illustrates an example of the current block and the adjacent blocks of a current frame.
FIG. 6 illustrates examples of blocks of the current frame and a reference frame.

Here, the prediction candidate selector 210 may select the motion vectors of the adjacent blocks of the current block as one or more motion vector prediction candidates. That is, referring to FIG. 5 illustrating an example of the current block and the adjacent blocks of the current frame, the one or more motion vector prediction candidates may be motion vectors of the adjacent blocks L, UL, U, and UR located adjacent to the current block, in the current frame in which the current block X to be encoded is located. FIG. 5 illustrates only the left block L of the current block, the upper left block UL of the current block, the upper block U of the current block, and the upper right block UR of the current block, but the motion vector prediction candidate may be any one of the upper blocks adjacent to the current block and any one of the left blocks adjacent to the current block, and even the motion vectors of other blocks not adjacent to the current block.

Further, the prediction candidate selector 210 may select one or more motion vectors among the motion vector of the Col block located at the same place as the current block and the motion vectors of the adjacent blocks of the Col block in the reference frame, as one or more motion vector prediction candidates. That is, referring to FIG. 6 illustrating examples of blocks of the current frame and the reference frame, the one or more motion vector prediction candidates may be the motion vector of the Col block, in which the position of a central pixel is the same as the position of the current block X, and the motion vectors of the adjacent blocks ($UL_{Col}$, $U_{Col}$, $UR_{Col}$, $L_{Col}$, $R_{Col}$, $BL_{Col}$, $B_{Col}$ and $BR_{Col}$) of the Col block, in the reference frame (frame t−1). FIG. 6 illustrates only the Col block and the adjacent blocks ($UL_{Col}$, $U_{Col}$, $UR_{Col}$, $L_{Col}$, $R_{Col}$, $BL_{Col}$ $B_{Col}$ and $BR_{Col}$) of the Col block, but the motion vector prediction candidates may be the motion vectors of other blocks not adjacent to the Col block as well as the other blocks adjacent to the Col block.

Figure 7:
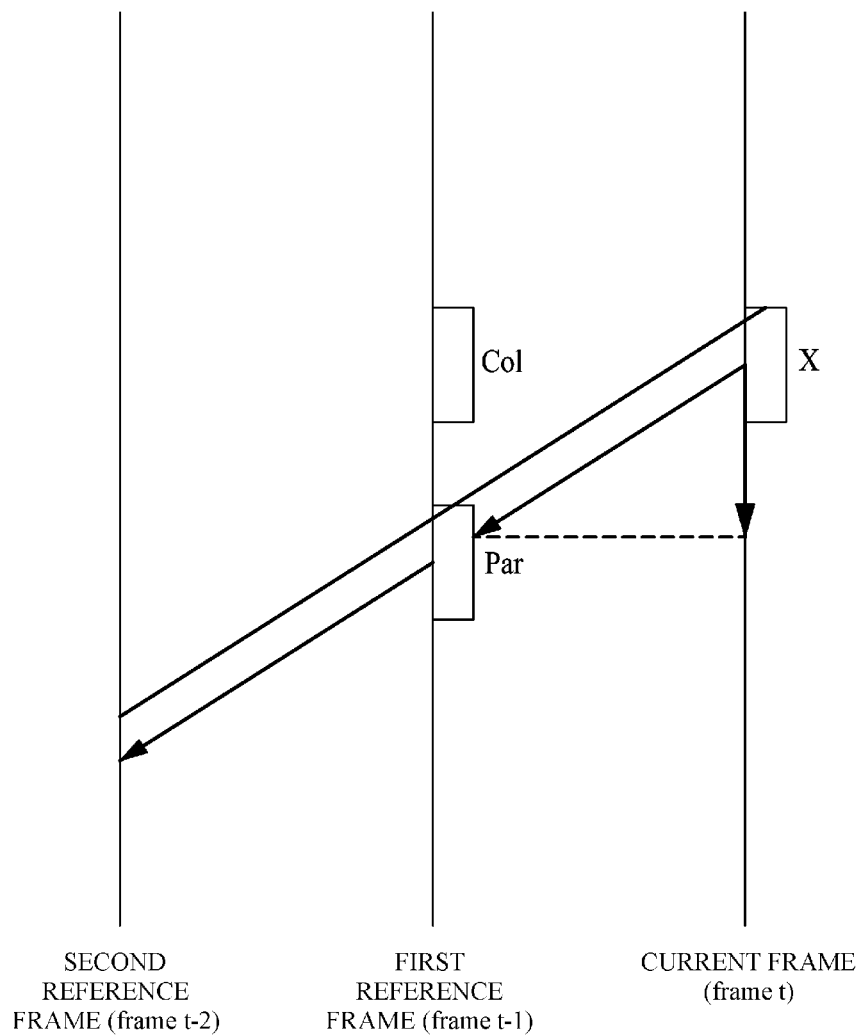
FIG. 7 illustrate an example for describing an indication vector.

Moreover, the prediction candidate selector 210 can select an indication vector, which indicates a particular block of the reference frame, in the current block of the current frame, as the one or more motion vector prediction candidates. That is, referring to FIG. 7 illustrating an example for describing the indication vector, when the vector indicating a certain block Par of the first reference frame (frame t−1), in the current block X of the current frame (frame t), and the motion vector of the block Par of the first reference frame (frame t−1) level with each other or a difference between the vector indicating the certain block Par and the motion vector of the block Par is smaller than a preset threshold, the vector indicating the block Par of the first reference frame (frame t−1), in the current block X of the current frame (frame t) may be selected as the motion vector prediction candidate. Here, the vector, which indicates the block Par of the first reference frame (frame t−1), in the current block X of the current frame (frame t) is the indication vector. Accordingly, the aforementioned particular block may be a block having a motion vector, which levels with the indication vector or be a block having a motion vector, which differs by less than a preset threshold from the indication vector.

When the prediction candidate selector 210 selects one or more motion vectors, the prediction candidate selection flag encoder 250 may generate and encode the prediction candidate selection flag in order to identify the case where the motion vector prediction candidate selected by the prediction candidate selector 210 is changed. The encoded prediction candidate selection flag may be inserted to a bit-stream header.

As another example, the prediction candidate selector 210 may select a part of the motion vector prediction candidates from the one or more motion vector prediction candidates according to a defined regulation. That is, the prediction candidate selector 210 may select some motion vector prediction candidates among the one or more motion vector prediction candidates according to an image characteristic through a predetermined reference, and then determine the predicted motion vector only among the selected motion vector prediction candidates. In this case, in order to identify which motion vector prediction candidates among the one or more motion vector prediction candidates have been selected as the part of the motion vector prediction candidates, the prediction candidate selection flag encoder 250 may generate and not encode the prediction candidate selection flag for identifying the part of the motion vector prediction candidates selected by the prediction candidate selector 210.

Here, the predetermined reference may be a probability, by which each of the one or more motion vector prediction candidates is determined as the current motion vector. When the probability is used, the prediction candidate selector 210 calculates the probability, by which each of the one or more motion vector prediction candidates is determined as the current motion vector, by encoding one or more areas of the current frame by using each of the one or more motion vector prediction candidates, and then may select the part of the motion vector prediction candidates according to the calculated probability. For example, based on an assumption that the number of one or more motion vector prediction candidates is five, A, B, C, D, and E, the prediction candidate selector 210 calculates the probability (i.e. probabilities, by which the five motion vector prediction candidates are determined as the current motion vector), by which each of the five motion vector prediction candidates is determined as the optimal motion vector, by virtually encoding the certain areas of the current frame. When the calculated probabilities are A: 80%, B: 10%, C: 5%, D: 3%, and E: 2%, the motion vector prediction candidate A, or motion vector prediction candidates A and B may be selected as the part of the motion vector prediction candidates.

Further, the predetermined reference may be a correlation. When the correlation is used, the prediction candidate selector 210 may select motion vector prediction candidates having the correlation between them among the one or more motion vector prediction candidates, as one or more groups, and select respective representative motion vectors representing each of the selected groups, as the part of the motion vector prediction candidates. Here, the representative motion vector may be selected by a median value, an average value, or a value depending on the priority of the motion vector prediction candidates in each of the selected groups.

For example, when the one or more motion vector prediction candidates are the motion vectors described above through FIG. 5 to FIG. 7, only the motion vectors (MV_L, MV_UL, MV_U, and MV_UR) of the part of the adjacent blocks among the adjacent blocks of the current block described through FIG. 5 may be gathered and selected as one group A, a value MVp_Group A determined by the median value operation or the priority may be determined as the representative motion vector as defined by Equation 3, and the representative motion vector may be selected as the part of the motion vector prediction candidates.

$$\text{MV}p\_GroupA = \text{median}(\text{MV}\_L, \text{MV}\_UL, \text{MV}\_U, \text{MV}\_UR) \quad \text{[Equation 3]}$$

Further, the motion vector (MV_Col) of the Col block (Col) and the motion vectors ($MV\_U_{Col}$, $MV\_L_{Col}$, $MV\_R_{Col}$, and $MV\_B_{Col}$) of the upper, lower, left, and right blocks ($U_{Col}$, $L_{Col}$, $R_{Col}$ and $B_{Col}$) of the Col block among the adjacent blocks of the Col block described through FIG. 6 may be gathered and selected as one group B, a value MVp_Group B determined by the average value operation may be determined as the representative motion vector as defined by Equation 4, and the representative motion vector may be selected as the part of the motion vector prediction candidates.

$$\text{MV}p\_GroupB = \text{average}(\text{MV}\_Col, \text{MV}\_U_{Col}, \text{MV}\_L_{Col}, \text{MV}\_R_{Col}, \text{MV}\_B_{Col}) \quad \text{[Equation 4]}$$

Further, the motion vector (MV_Col) of the Col block (Col) and the motion vectors ($MV\_UL_{Col}$, $MV\_U_{Col}$, $MV\_UR_{Col}$, $MV\_L_{Col}$, $MV\_R_{Col}$, $MV\_BL_{Col}$, $MV\_B_{Col}$, and $MV\_BR_{Col}$) of the adjacent blocks ($UL_{Col}$, $U_{Col}$, $UR_{Col}$, $L_{Col}$, $R_{Col}$, $BL_{Col}$, $B_{Col}$, and $BR_{Col}$) of the Col block described through FIG. 6 may be gathered and selected as one group C, a value MVp_Group C determined by the median value operation may be determined as the representative motion vector as defined by Equation 5, and the representative motion vector may be selected as the part of the motion vector prediction candidates.

$$\text{MV}p\_GroupC = \text{median}(\text{MV}\_Col, \text{MV}\_UL_{col}, \text{MV}\_U_{col}, \text{MV}\_UR_{col}, \text{MV}\_R_{col}, \text{MV}\_BL_{col}, \text{MV}\_B_{col}, \text{MV}\_BR_{col}) \quad \text{[Equation 5]}$$

As described above, the representative motion vectors calculated by Equations 4 and 5, and the indication vector described through FIG. 7 may be selected as the part of the motion vector prediction candidates. In this case, when MVp_ groupA, MVp_groupB, MVp_groupC, MV_col, and MV_par are changed as the part of the motion vector prediction candidates, the prediction candidate selection flag encoder 250 may generate and encode the prediction candidate selection flag for indicating the change, or may use the motion vector prediction candidate identically agreed upon by the encoder and the decoder. The prediction candidate identification flag encoder 240 may, of course, generate and encode the prediction candidate identification flag for indicating which motion vector prediction candidate among the part of the motion vector prediction candidates MVp_groupA, MVp_groupB, MVp_groupC, MV_col, and MV_par is determined as the predicted motion vector.

Further, the prediction candidate selector 210 may select one or more predetermined motion vector prediction candidates among the one or more motion vector prediction candidates as the part of the motion vector prediction candidates. Here, the one or more predetermined motion vector prediction candidates may be randomly selected by in a random order.

Moreover, the predicted motion vector determiner 220 may determine the predicted motion vector by the unit of the motion vector (i.e. the predicted motion vector determiner 220 selects any one from the motion vector prediction candidates) or by the unit of each component of the motion vector, by using the one or more motion vector prediction candidates. As an example, the predicted motion vector determiner 220 may determine the motion vector prediction candidate, which has a minimum amount of bits required for encoding the differential motion vector calculated by using each of the motion vector prediction candidates, among the one or more motion vector prediction candidates selected by the prediction candidate selector 210, as the predicted motion vector. Therefore, the predicted motion vector determiner 220 calculates the differential motion vector on the assumption that each of the motion vector prediction candidates is the predicted motion vector, encodes the calculated differential motion vector, and then may determine the motion vector prediction candidate having the minimum encoded data, as the predicted motion vector. In this case, the prediction candidate identification flag encoder 240 may generate and encode the prediction candidate identification flag for identifying the motion vector prediction candidate determined as the predicted motion vector in order to identify which motion vector prediction candidate among the one or more motion vector prediction candidates has been determined as the predicted motion vector every time the motion vector of the current block is encoded (i.e. every time the differential motion vector of the determined predicted motion vector and the current motion vector are encoded).

As another example, the predicted motion vector determiner 220 may independently determine each of the x-component and the y-component of the predicted motion vector. That is, the predicted motion vector determiner 220 may determine the x-component of one motion vector prediction candidate among the x-components of the one or more motion vector prediction candidates, as the x-component of the predicted motion vector, and determine the y-component of one motion vector prediction candidate among the y-components of the one or more motion vector prediction candidates, as the y-component of the predicted motion vector. For example, when the differential motion vector is encoded, if it is supposed that the bit amount of the differential motion vector is proportional to the absolute value of the size of the differential motion vector, the one or more motion vector prediction candidates are (−4, −4), (2, 2), (4, 4), and (14, 14), and the current motion vector is (0, 4), a vector of (2, 2), or (4, 4) may be determined as the predicted motion vector according to the prior art. Also, in the example described above, 2 may be selected among −4, 2, 4, and 14 as the x-component of the predicted motion vector, and 4 may be selected from −4, 2, 4, and 14 as the y-component of the predicted motion vector. That is, unlike the known case in which the x-component and the y-component cannot be independently selected, the x-component and the y-component having the optimal values may be independently selected as the predicted motion vector.

In this case, when the absolute value of the x-component of the differential motion vector is larger than a predetermined threshold of the x-component and the absolute value of the y-component of the differential motion vector is larger than a predetermined threshold of the y-component, the prediction candidate identification flag encoder 240 may not generate the prediction candidate identification flag and thus may encode and not transmit the prediction candidate identification flag. Further, when the absolute value of the x-component of the differential motion vector is smaller than or the same as the predetermined threshold of the x-component and the absolute value of the y-component of the differential motion vector is smaller than or the same as the predetermined threshold of the y-component, the prediction candidate identification flag encoder 240 can generate and encode the prediction candidate identification flag for identifying the one or more determined motion vector prediction candidates among the x-component of the predicted motion vector and the y-component of the predicted motion vector. That is, when both components (x-component and y-component) of the predicted motion vector are larger than the thresholds of the corresponding components, respectively, the prediction candidate identification flag encoder 240 does not generate the prediction candidate identification flag. When only one component is smaller than the threshold of the corresponding component, the prediction candidate identification flag encoder 240 may generate the prediction candidate identification flag for identifying which motion vector prediction candidate is used as another component larger than the threshold. When neither of the two components is larger than the threshold of the corresponding component, the prediction candidate identification flag encoder 240 generates and encodes the prediction candidate identification flag for identifying which motion vector prediction candidate is used as the two components.

Here, when the absolute values of the two components of the differential motion vector are larger than the thresholds of the corresponding components, respectively so that the prediction candidate identification flag is not generated and the absolute values of the two components of the differential motion vector are smaller than or the same as the thresholds of the corresponding components, respectively so that the prediction candidate identification flag is generated and encoded, the prediction candidate identification flag encoder 240 may independently generate the prediction candidate identification flags for identifying which motion vector prediction candidates among the selected motion vector prediction candidates has been determined as the predicted motion vector for each of the two cases, and encode the prediction candidate identification flags for each of the two cases. Also, in the image decoding apparatus, when the absolute values of the two components of the differential motion vector are larger than the thresholds of the corresponding components, respectively so that the prediction candidate identification flag is not transmitted and the absolute values of the two components of the differential motion vector are smaller than or the same as the thresholds of the corresponding components, respectively so that the prediction candidate identification flag is transmitted, the predicted motion vector may be determined by separately decoding the motion vector prediction candidates.

For example, one of the motion vector prediction candidates selected from the group A is determined as the predicted motion vector and the differential motion vector is then calculated by using the predicted motion vector. When the absolute values of the two components of the differential motion vector are larger than the thresholds of the corresponding components, respectively, the prediction candidate identification flag may be generated and not encoded. When the absolute values of the two components of the differential motion vector are smaller than the thresholds of the corresponding components, respectively, any one among the motion vector prediction candidates selected from the group B is determined as the predicted motion vector, the differential motion vector is calculated, and the prediction candidate identification flag for identifying which motion vector prediction candidate among the motion vector prediction candidates selected from the group B is determined as the predicted motion vector may be generated and encoded. That is, when the absolute values of the two components of the differential motion vector are larger than the thresholds of the corresponding components, respectively, the selected motion vector prediction candidates of the group A may be used, and when the absolute values of the two components of the differential motion vector are smaller than or the same as the thresholds of the corresponding components, respectively, the selected motion vector prediction candidates of the group B may be used.

Here, each of the component thresholds (x-component threshold and y-component threshold) may be calculated by using various methods. As an example, the x-component threshold may be a maximum value among values obtained by dividing difference values between the x-components of two motion vector prediction candidates, which are located most adjacently to each other, among the x-components of the one or more motion vector prediction candidates by a predetermined number. The y-component threshold may be a maximum value among values obtained by dividing difference values between the y-components of two motion vector prediction candidates, which are located most adjacently to each other, among the y-components of the one or more motion vector prediction candidates by a predetermined number. That is, after calculating $thre_{ij}$ for every two motion vector prediction candidates ($MVp_{Cand}(i)$ and $MVp_{Cand}(j)$) located most adjacently to each other, each of the component thresholds may be obtained as the maximum value among the calculated $thre_{ij}$ as defined by Equation 6.

$$Thre_{ij} = \left\lceil \min\left(\left|\frac{MVp_{Cand}(i) - MVp_{Cand}(j)}{2}\right|\right)\right\rceil \quad \text{[Equation 6]}$$

Threshold = max($threshold_{ij}$)

Figure 8:
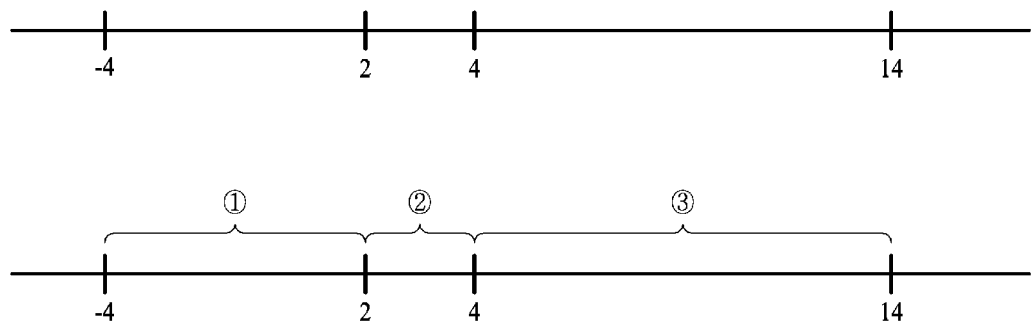
FIG. 8 illustrates an example for describing a process of calculating a threshold.

Referring to FIG. 8 illustrating an example for describing a process of calculating the threshold, based on an assumption that the x-components of the motion vector prediction candidate are "−4", "2", "4", and "14" as shown in FIG. 8, values obtained by dividing difference values between the x-components of each of the motion vector prediction candidates by 2 are "3" in a section ①, "1" in a section ②, and "5" in a section ③, and the maximum value is "5". Therefore, the threshold is "5".

Figure 9:
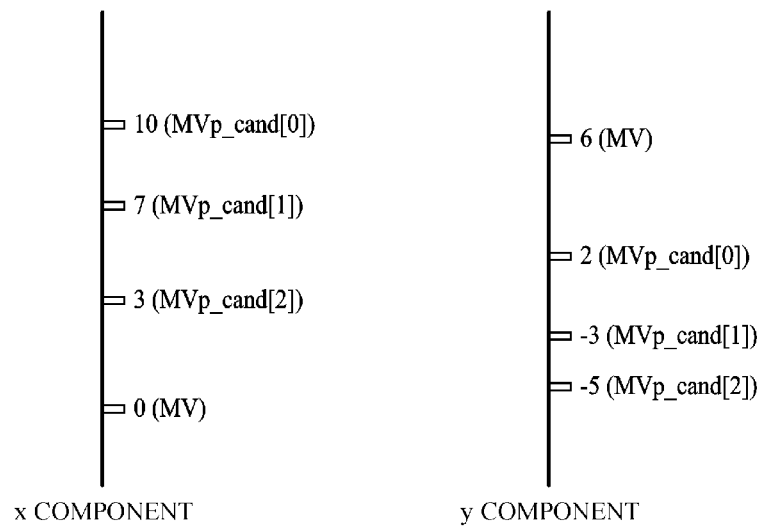
FIG. 9 is examples illustrating motion vector prediction candidates and current motion vectors divided for each component.

Referring to FIG. 9 illustrating examples of the motion vector prediction candidates and the current motion vector divided for each of the components, the x-component threshold is "2", and the y-component threshold is "3". In this case, since the x-component of the predicted motion vector is determined as "3" ($MVp\_{Cand}[2]$), the x-component of the differential motion vector is "−3" and since the y-component of the predicted motion vector is determined as "2" ($MVp\_{Cand}[0]$), the y-component of the differential motion vector is "+4". The absolute values of the two components of the differential motion vector are larger than the thresholds of the corresponding components, respectively so that the prediction candidate identification flag encoder 240 may generate and not encode the prediction candidate identification flag for indicating which motion vector prediction candidate among the motion vector prediction candidates has been determined as the predicted motion vector. Through such a principle, in reconstructing the current motion vector in the image decoding apparatus, even when it is impossible to recognize which motion vector prediction candidate among the one or more motion vector prediction candidates is determined as the predicted motion vector due to the nonexistence of the prediction candidate identification flag, the image decoding apparatus can recognize which motion vector prediction candidate is determined as the predicted motion vector by identifying whether the x-component and the y-component are larger than the thresholds of the corresponding components, respectively. Then, when the x-component and the y-component are larger than the thresholds of the corresponding components, respectively, the image decoding apparatus can recognize which motion vector prediction candidate is determined as the predicted motion vector by itself.

Further, as another example, the x-component threshold may be values obtained by dividing difference values between the x-components of every two motion vector prediction candidates, which are located most adjacently to each other, among the x-components of the one or more motion vector prediction candidates by a predetermined number. The y-component threshold may have values obtained by dividing difference values between the y-components of every two motion vector prediction candidates, which are located most adjacently to each other, among the y-components of the one or more motion vector prediction candidates by a predetermined number. That is, each of the component thresholds may not be a maximum value among values obtained by dividing distances between every two motion vector prediction candidates, which are located most adjacently to each other, by two as shown in FIG. 6, and instead the component thresholds may be values obtained by dividing distances between every two motion vector prediction candidates by two as shown in FIG. 7. Therefore, when the number of the motion vector prediction candidates is N, the number of the component thresholds is N−1. However, n is defined as 0≤n≤N in Equation 7.

$$Threshold_k = \left\lceil \min\left(\left|\frac{MVp_{Cand}(i) - MVp_{Cand}(j)}{2}\right|\right) \right\rceil \quad \text{[Equation 7]}$$

For example, in the case of FIG. 8, a first threshold $Threshold_1$ of the x-component is "3", a second threshold $Threshold_2$ of the x-component is "1", and a third threshold $Threshold_3$ of the x-component is "5".

In this case, the prediction candidate identification flag encoder 240 may generate and encode different prediction candidate identification flags according to the size of the absolute value of each component and the threshold of each component of the differential motion vector. That is, the prediction candidate identification flag encoder 240 arranges the N−1 number of thresholds in a descending order. Then, when the absolute values of the corresponding components of the differential motion vector are smaller than or the same as the smallest thresholds of the corresponding components, respectively, the prediction candidate identification flag encoder 240 generates and encodes the prediction candidate identification flag for identifying which motion vector prediction candidate among the N number of selected motion vector prediction candidates has been determined as the predicted motion vector. When the absolute values of the corresponding components of the differential motion vector are smaller than or the same as the second smallest thresholds of the corresponding components, respectively, the prediction candidate identification flag encoder 240 generates and encodes the prediction candidate identification flag for identifying which motion vector prediction candidate among the N−1 number of selected motion vector prediction candidates is determined as the predicted motion vector, on the assumption that there is no current motion vector between the two motion vector prediction candidates having the smallest thresholds of the corresponding components. When the absolute values of the corresponding components of the differential motion vector are smaller than or the same as the third smallest thresholds of the corresponding components, respectively, the prediction candidate identification flag encoder 240 generates and encodes the prediction candidate identification flag for identifying which motion vector prediction candidate among the N−2 number of selected motion vector prediction candidates is determined as the predicted motion vector, on the assumption that there is no current motion vector between the two motion vector prediction candidates having the smallest thresholds of the corresponding components and no current motion vector between the two motion vector prediction candidates having the second smallest thresholds of the corresponding components.

By orderly comparing the respective absolute values of the corresponding components of the differential motion vector and the thresholds of the corresponding components through the method described above, the prediction candidate identification flag is generated and encoded. When the respective absolute values of the corresponding components of the differential motion vector are larger than all the thresholds of the corresponding components, respectively, it is not necessary to generate and encode the prediction candidate identification flag for identifying which motion vector prediction candidate among the N number of motion vector prediction candidates has been determined as the predicted motion vector. As described above, according to each of the absolute values of the corresponding components of the differential motion vector and each of the thresholds of the corresponding components, the length of the prediction candidate identification flag for identifying which motion vector prediction candidate has been determined as the predicted motion vector may be changed.

According to the above method, when the respective absolute values of the corresponding components of the differential motion vector are larger than all the thresholds of the corresponding components, the predicted motion vector may be individually determined for each component of the motion vector prediction candidate. When the absolute value of only one component among the absolute values of the two components is larger than all the thresholds of the corresponding component, the prediction candidate identification flag for identifying which motion vector prediction candidate among the motion vector prediction candidates has been determined as the predicted motion vector is transmitted, only for another component, which has the absolute value not larger than all the thresholds, of the differential motion vector. That is, when only one of the absolute values of the two components of the differential motion vector is larger than the largest threshold of the corresponding component, the prediction candidate identification flag for identifying the motion vector prediction candidate including the component having the absolute value not larger than the largest threshold may be generated and encoded. When all the absolute values of the two components of the differential motion vector are not larger than the largest thresholds of the corresponding components, the prediction candidate identification flag for independently identifying which motion vector prediction candidate has been determined as the predicted motion vector for each of the components is not generated and encoded, but two components may simultaneously generate and encode the prediction candidate identification flag for identifying the motion vector prediction candidate determined as the predicted motion vector.

For example, referring to FIG. 8 described above and FIG. 10 illustrating an example of the prediction candidate identification flag according to a plurality of thresholds, the number of prediction candidates is four and each of the thresholds is "1", "3", and "5". FIG. 10 illustrates sections divided according to the three thresholds. A section indicated by ① represents the x-component of the motion vector prediction candidate, a section indicated by ② represents a section at which the x-component of the current motion vector is located when the absolute value of the x-component of the differential motion vector is smaller than or the same as the smallest threshold of the x-component, a section indicated by ③ represents a section at which the x-component of the current motion vector is located when the absolute value of the x-component of the differential motion vector is smaller than or the same as the second smallest threshold of the x-component, a section indicated by ④ represents a section at which the x-component of the current motion vector is located when the absolute value of the x-component of the differential motion vector is smaller than or the same as the largest threshold of the x-component, and a section indicated by ⑤ represents a section at which the x-component of the current motion vector is located when the absolute value of the x-component of the differential motion vector is larger than the largest threshold of the x-component.

The prediction candidate identification flag encoder 240 may generate and encode the prediction candidate identification flag for identifying which motion vector prediction candidate among the four motion vector prediction candidates has been determined as the predicted motion vector, in the section indicated by ②, generate and encode the prediction candidate identification flag for identifying which motion vector prediction candidate among the three motion vector prediction candidates has been determined as the predicted motion vector, in the section indicated by ③, generate and encode the prediction candidate identification flag for identifying which motion vector prediction candidate among the two motion vector prediction candidates has been determined as the predicted motion vector, in the section indicated by ④, and may not generate the prediction candidate identification flag, in the section indicated by ⑤.

When the x-component of the current motion vector is "8", the x-component of the predicted motion vector is "4". At this time, the x-component of the differential motion vector is "+4", so the absolute value of "+4" is smaller than "5", which is the largest threshold of the x-component, and larger than "3", which is the second largest threshold of the x-component. Therefore, the prediction candidate identification flag for identifying any one between the x-components "4" and "14" of the motion vector prediction candidate is generated and encoded.

In the image decoding apparatus, the x-component of the differential motion vector is "+4". Therefore, based on an assumption that the x-component "−4" of the motion vector prediction candidate is the x-component of the predicted motion vector, the x-component of the current motion vector is "0". However, based on an assumption that the x-component of the current motion vector is "0", the x-component of the optimal predicted motion vector (i.e. to make the x-component of the differential motion vector has a minimum value) is "2" so that the x-component "−4" of the motion vector prediction candidate is not the predicted motion vector. Through the above method, it can be seen that the x-components "−4" and "2" of the motion vector prediction candidate are not determined as the predicted motion vector. Therefore, the prediction candidate identification flag for identifying which value among the x-components "4" and "14" of the motion vector prediction candidate, which may be determined as the predicted motion vector, is determined as the x-component of the predicted motion vector is generated and encoded. As described above, when a plurality of thresholds for each of the components are calculated, the absolute values of the corresponding components of the differential motion vector and the plural thresholds of the corresponding components are compared, respectively, and then different prediction candidate identification flags are generated and encoded, an encoded bit amount of the prediction candidate identification flags, which should be transmitted when the current motion vector is encoded, may be reduced, thereby improving the compression efficiency. The image decoding apparatus may identify which motion vector prediction candidate is determined as the predicted motion vector by using only such a prediction candidate identification flag.

As another example, when distances between the motion vector prediction candidates among the selected motion vector prediction candidates are smaller than a certain threshold, it is considered that only one motion vector prediction candidate between two motion vector prediction candidates is selected, the distance between the two motion vector prediction candidates being smaller than the certain threshold. Therefore, the prediction motion vector determiner 220 excludes the motion vector prediction candidate, which is not selected, from the motion vector prediction candidates and may determine any one motion vector prediction candidate among the remaining motion vector prediction candidates, which are not excluded, as the predicted motion vector. In the image decoding apparatus, when distances between the motion vector prediction candidates among the selected motion vector prediction candidates is smaller than a certain threshold, it is considered that only one motion vector prediction candidate between two motion vector prediction candidates is selected, the distance between the two motion vector prediction candidates being smaller than the certain threshold. Therefore, the motion vector prediction candidate, which is not selected, is excluded from the motion vector prediction candidates and any one motion vector prediction candidate among the remaining motion vector prediction candidates, which are not excluded, may be determined as the predicted motion vector.

For example, when the certain threshold is "2" and the number of selected motion vector prediction candidates is three, if a first motion vector prediction candidate is "−5", a second motion vector prediction candidate is "8", and a third motion vector prediction candidate is "9", the distance between the second motion vector prediction candidate and the third motion vector prediction candidate is smaller than the certain threshold, so that the third motion vector prediction candidate is excluded from the motion vector prediction candidates and any one motion vector prediction candidate between the first motion vector prediction candidate and the second motion vector prediction candidate may be determined as the predicted motion vector. Through the above method, the number of selected motion vector prediction candidates is decreased, thereby reducing the bit amount in order to encode the prediction candidate identification flag.

Further, when the prediction candidate identification flag encoder 240 generates the prediction candidate identification flag, the prediction candidate identification flag encoder 240 may generate the prediction candidate identification flag by using various schemes. As an example, the prediction candidate identification flag encoder 240 may generate the motion vector prediction identification flag having the highest probability, by which the motion vector prediction candidate is determined as the predicted motion vector, is determined as the current motion vector among one or more motion vector prediction candidates.

That is, the maximum length L required for encoding the prediction candidate identification flag is calculated by using the number of motion vector prediction candidates (NumofMV$p_{Cand}$) as defined by Equation 8.

$N = \lceil \log_2(\text{NumOfMV}p_{Cand}) \rceil$ [Equation 8]

$N = \log_2(\text{NumOfMV}p_{Cand} - 1)$ [Equation 9]

On the assumption that M, which is obtained by taking $\log_2$ to a value obtained by subtracting "1" from the number of calculated motion vector prediction candidates, is an integer as defined by Equation 9, when the prediction candidate identification flag for identifying the motion vector prediction candidate determined as the predicted motion vector is generated and encoded, if the motion vector prediction candidate having the highest probability is the predicted motion vector, the prediction candidate identification flag is generated and encoded as 1 bit as shown in FIG. 11 illustrating an example of the transmission bit of the prediction candidate identification flag.

For example, when the number of motion vector prediction candidates is three (MVp_$_{Cand}$[i]:0≤i<3), the maximum bit length L required for encoding the prediction candidate identification flag is "2" so that the prediction candidate identification flag for identifying which motion vector prediction candidate among the selected motion vector prediction candidates has been determined as the predicted motion vector may be generated by 2 bits. At this time, since M is an integer as defined by Equation 9, the motion vector prediction candidate having the highest probability is generated and encoded by 1 bit. When the 1 bit prediction candidate identification flag is "1", it identifies that the motion vector prediction candidate having the highest probability has been determined as the predicted motion vector. When the 1 bit prediction candidate identification flag is "0", it identifies that the motion vector prediction candidate having the highest probability has not been determined as the predicted motion vector. Therefore, another flag of 2 bits for identifying the remaining two motion vector prediction candidates is generated and encoded. When M is an integer, the image decoding apparatus identifies whether the motion vector prediction candidate having the highest probability has been determined as the predicted motion vector by reading only 1 bit of the prediction candidate identification flag. Only when the motion vector prediction candidate having the highest probability has not been determined as the predicted motion vector, the image decoding apparatus identifies which motion vector prediction candidate is determined as the predicted motion vector by additionally reading bits.

At this time, prediction candidate identification flag encoder 240 may calculate the probability, by which each of the one or more motion vector prediction candidates is determined as the current vector, by encoding one or more areas of the current frame by using the one or more motion vector prediction candidates, follow a randomly designated and set probability or select a randomly designated and set motion vector prediction candidate as the motion vector prediction candidate having the highest probability.

As another example, the prediction candidate identification flag encoder 240 may generate and encode the prediction candidate identification flag only when the one or more motion vector prediction candidates are not identical to each other. That is, identical motion vector prediction candidates among the selected motion vector prediction candidates are considered as one motion vector prediction candidate. When all the selected motion vector prediction candidates are identical, even if any motion vector prediction candidate is determined as the predicted motion vector, the determined motion vector prediction candidate is optimal. Accordingly, the prediction candidate identification flag for identifying which motion vector prediction candidate among the motion vector prediction candidates has been determined as the predicted motion vector may be generated and not encoded. In this case, the image decoding apparatus also does not decode the prediction candidate identification flag.

As another example, when a block type of the current block is a SKIP mode, if one or more P block and B block are provided, the prediction candidate identification flag encoder 240 may generate and encode the prediction candidate identification flag for each case of a P block and a B block. That is, when the block type of the current block is the SKIP mode, the predicted motion vector determiner 220 may select different motion vector prediction candidates for each of the P block and the B block. In this case, prediction candidate identification flag encoder 240 may generate and encode different prediction candidate selection flags according to each of the cases. At this time, when the block type of the current block is the SKIP mode, the prediction candidate selector 210 and the prediction candidate selection flag encoder 250 also insert different motion vector prediction candidates selected according to each case of the P block and the B block to the bit-stream header and then transmit them. When the block type of the current block is the SKIP mode, the image decoding apparatus also may decode and determine different motion vector prediction candidates selected according to each case of the P block and the B block.

Figure 12:
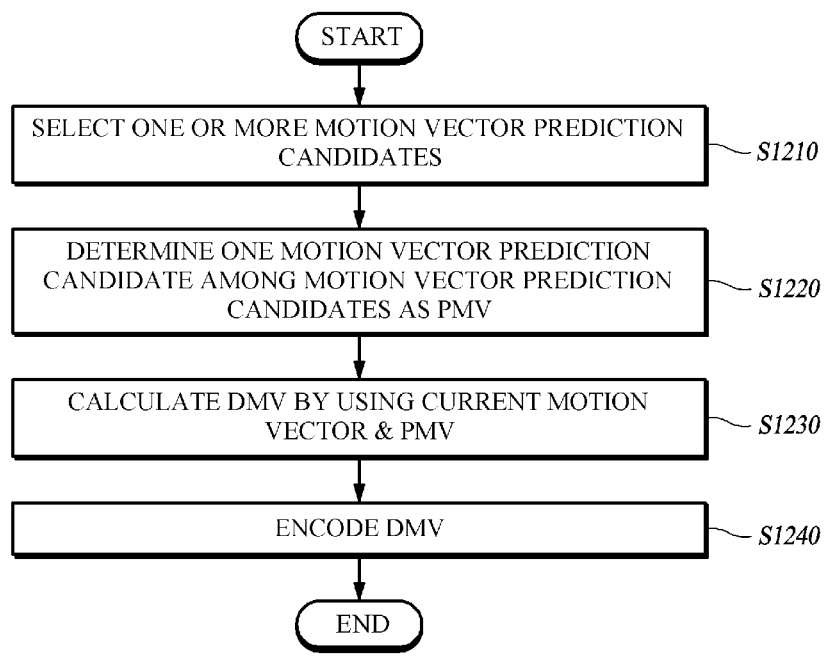
FIG. 12 is a flow chart for describing a motion vector encoding method according to an aspect of the present disclosure.

FIG. 12 is a flow chart for describing a motion vector encoding method according to an aspect of the present disclosure.

The encoder 150 selects one or more motion vector prediction candidates S1210, determines one motion vector prediction candidate among the one or more motion vector prediction candidates as the predicted motion vector S1220, calculates the differential motion vector by subtracting the predicted motion vector determined in step S1220 from a predetermined current motion vector S1230, and encodes the calculated differential motion vector S1240.

Here, the encoder 150 may generate and encode the prediction candidate identification flag for identifying which motion vector prediction candidate among the one or more selected motion vector prediction candidates has been determined as the predicted motion vector. Further, a method in which the encoder 150 selects the one or more motion vector prediction candidates, a method in which the encoder 150 determines the predicted motion vector, and a method in which the encoder 150 generates and encodes the prediction candidate identification flag are described through FIG. 2 to FIG. 11, so that a detailed description will be omitted. Further, the order of steps shown in FIG. 12 is only an example, and the present disclosure is not limited thereto. Also, the order may be selectively changed, and a part or all of the steps may be performed in parallel according to situations.

Figure 13:
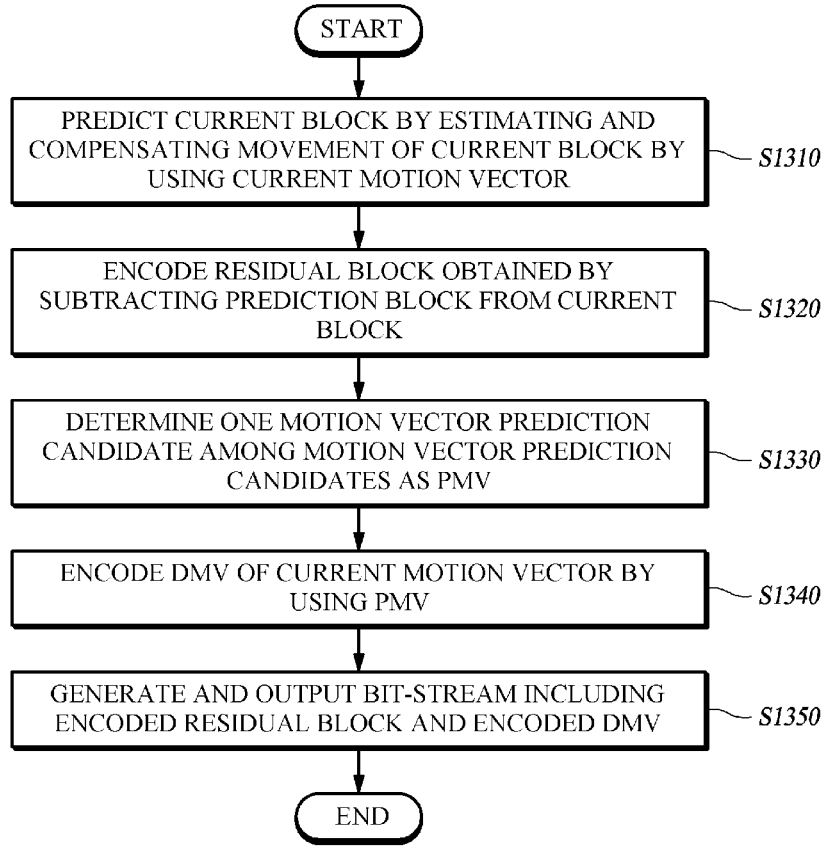
FIG. 13 is a flow chart for describing an image encoding method according to an aspect of the present disclosure.

FIG. 13 is a flow chart for describing an image encoding method according to an aspect of the present disclosure.

The image encoding apparatus 100 determines the current motion vector, and generates the predicted block by using the determined current motion vector S1310, and generates the residual block by performing subtraction between the predicted block and the current block, and quantizes and encodes the residual block by transforming the residual block S1320. The image encoding apparatus 100 determines one motion vector prediction candidate among the one or more motion vector prediction candidates as the predicted motion vector S1330, and encodes the differential motion vector obtained by subtracting the predicted motion vector determined in step S1330 from the current motion vector S1340. At this time, the image encoding apparatus 100 may generate and encode the prediction candidate identification flag. The image encoding apparatus 100 generates and outputs the bit-stream including the residual block encoded in step S1320 and the differential motion vector encoded in step S1340 S1350. The image encoding apparatus 100 may additionally include the encoded prediction candidate identification flag in the bit-stream when the prediction candidate identification flag is encoded. Further, the order of steps shown in FIG. 13 is only an example, and the present disclosure is not limited thereto. Also, the order may be selectively changed, and a part or all of the steps may be performed in parallel according to situations. As described above, the image, which is encoded and then included in the bit-stream by the image encoding apparatus 100, is transmitted to the image decoding apparatus, which will be described later, through wired-wireless communication networks such as an internet, a local wireless communication network, a wireless LAN network, a WiBro (Wireless Broadband) also known as WiMax network, and a mobile communication network in real time or non real time, or communication interfaces such as a cable, and a USB (Universal Serial Bus), is decoded in the image decoding apparatus, and then is reconstructed and reproduced as the image.

Figure 14:
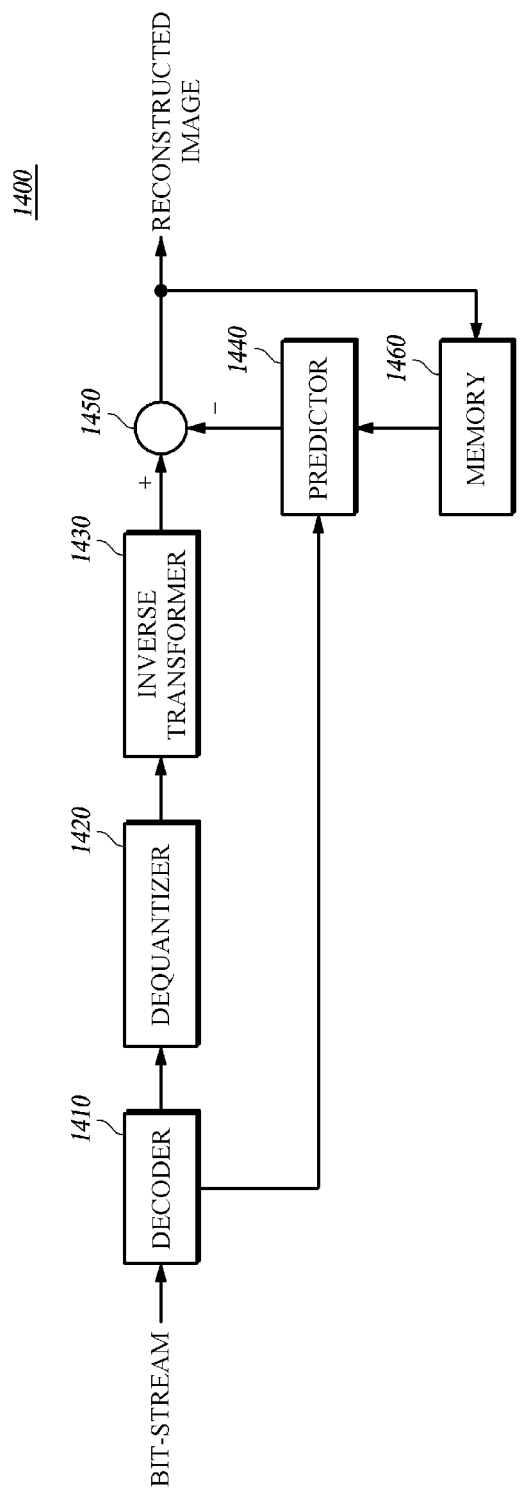
FIG. 14 is a block diagram briefly illustrating a construction of an image decoding apparatus according to an aspect of the present disclosure.

FIG. 14 is a block diagram briefly illustrating a construction of an image decoding apparatus according to an aspect of the present disclosure.

The image decoding apparatus 1400 according to an aspect of the present disclosure may include a decoder 1410, a dequantizer 1420, an inverse transformer 1430, a predictor 1440, an adder 1450, and a memory 1460. The image decoding apparatus 1400 may include a Personal Computer (PC), a notebook computer, a Personal Digital Assistant (PDA), a Portable Multimedia Play (PMP), a PlayStation Portable (PSP), a mobile communication terminal, etc., and refers to a communication device such as a communication modem for performing communication with various devices or wired-wireless communication networks, memories for storing various types of programs in order to decode an image, and a microprocessor for calculating and controlling a program by executing the program.

The decoder 1410 reconstructs the residual block and the differential motion vector by extracting the encoded residual block and the encoded differential motion vector from the bit-stream and decoding the encoded residual block and the encoded differential motion vector extracted from the bit-stream determines one motion vector prediction candidate among the one or more motion vector prediction candidates as the predicted motion vector, and reconstructs the current motion vector of the current block by adding the predicted motion vector to the reconstructed differential motion vector.

Here, the decoder 1410 additionally reconstructs the prediction candidate identification flag by additionally extracting the encoded prediction candidate identification flag from the bit-stream and decoding the encoded prediction candidate identification flag extracted from the bit-stream, and may determine the motion vector prediction candidate identified by the reconstructed prediction candidate identification flag among the one or more motion vector prediction candidates as the predicted motion vector.

Further, the decoder 1410 reconstructs the prediction candidate identification flag and a part of the prediction candidate identification flags by decoding the encoded prediction candidate identification flag and the encoded part of the prediction candidate identification flags included in the bit-stream, and may determine the motion vector prediction candidate identified by the reconstructed prediction candidate identification flag among a part of motion vector prediction candidates identified by the part of the reconstructed prediction candidate identification flags among the one or more motion vector prediction candidates as the predicted motion vector.

Moreover, the decoder 1410 additionally reconstructs the prediction candidate identification flag by additionally extracting the encoded prediction candidate identification flag from the bit-stream and decoding the encoded prediction candidate identification flag extracted from the bit-stream, and may determine one or more components among the x-component and the y-component of the motion vector prediction candidate identified by the reconstructed prediction candidate identification flag as one or more components among the x-component and the y-component of the predicted motion vector when one or more absolute values among the absolute values of the x-component and the y-component of the reconstructed differential motion vector are smaller than or the same as one or more thresholds among predetermined thresholds of the x-component and the y-component.

The dequantizer 1420 dequantizes the residual block reconstructed by the decoder 1410. The inverse transformer 1430 inversely transforms the residual block dequantized by the dequantizer 1420. The predictor 1440 generates the predicted block by using the current motion vector reconstructed by the decoder 1410. The adder 1450 reconstructs the current block by adding the residual block inversely transformed by the inverse transformer 1430 to the predicted block predicted by the predictor 1440. The memory 1460 stores the reconstructed current block outputted from the adder 1450 by the unit of the frame as the reference frame, so that the predictor 1440 may use the reference frame.

It is not illustrated in FIG. 14, but the image decoding apparatus 100 according to an aspect of the present disclosure as described above may further include an intra predictor for intra prediction, and a deblocking filter for deblocking filtering the reconstructed current block, base on the H.264/AVC standard.

Figure 15:
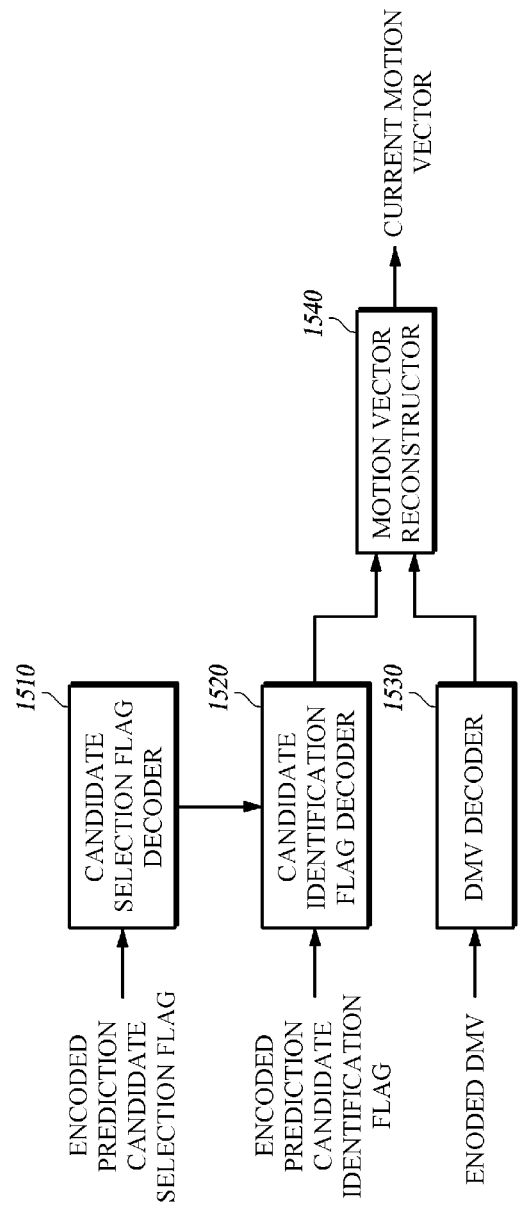
FIG. 15 is a block diagram briefly illustrating a construction of a motion vector decoding apparatus according to an aspect of the present disclosure.

FIG. 15 is a block diagram briefly illustrating a construction of a motion vector decoding apparatus according to an aspect of the present disclosure.

The motion vector decoding apparatus according an aspect of the present disclosure may be implemented as the decoder 1410 in the image decoding apparatus according to an aspect of the present disclosure described through FIG. 14. Hereinafter, for the convenience of description, the motion vector decoding apparatus according to an aspect of the present disclosure is referred to as the decoder 1410.

The decoder 1410 according to an aspect of the present disclosure may include a differential motion vector decoder 1530 and a motion vector reconstructor 1540. Furthermore, the decoder 1410 may further include a prediction candidate selection flag decoder 1510 and a prediction candidate identification flag decoder 1520 according to situations. In addition, the decoder 1410 may further include an image decoder for decoding the encoded residual block, but the image decoder is apparent to those skilled in the art so that a detailed description will be omitted.

The differential motion vector decoder 1530 reconstructs the differential motion vector by decoding the encoded differential motion vector. The motion vector reconstructor 1540 determines one motion vector prediction candidate among the one or more motion vector prediction candidates as the predicted motion vector, and then reconstructs the current motion vector of the current block by adding the determined predicted motion vector to the reconstructed differential motion vector.

The prediction candidate selection flag decoder 1510 reconstructs the encoded prediction candidate selection flag included in the bit-stream header. The candidate identification flag decoder 1530 reconstructs the one or more prediction candidate identification flags by extracting one or more prediction candidate identification flags among the encoded prediction candidate identification flags from the bit-stream and decoding the encoded prediction candidate identification flags extracted from the bit-stream. The motion vector reconstructor 1540 may determine the motion vector prediction candidate identified by the prediction candidate selection flag reconstructed by the candidate selection flag decoder 1510 as the one or more motion vector prediction candidates, and the motion vector prediction candidate identified by the prediction candidate identification flag reconstructed by the candidate identification flag decoder 1520 as the predicted motion vector.

Here, when there is no candidate selection flag decoder 1510 or the prediction candidate selection flag is not reconstructed by the candidate selection flag decoder 1510, the motion vector reconstructor 1530 may select one or more motion vectors of adjacent blocks of the current block, a motion vector of the Col block located at the same place as the center of the current block in the reference frame, motion vectors of adjacent blocks of the Col block, and an indication vector of indicating a particular block of the reference frame, in the current block, as one or more motion vector prediction candidates. Here, the particular block may be a block parallel to the indication vector, or a block having a motion vector, and the difference between the motion vector and the indication vector is smaller than a predetermined threshold, like the encoder 150. The above has been described through FIG. 5 to FIG. 7 so that a detailed description will be omitted.

Further, when the one or more selected motion vector prediction candidates are all the same, it is supposed that all the same motion vector prediction candidates are one motion vector prediction candidate. The candidate identification flag decoder 1520 determines the motion vector prediction candidate as the predicted motion vector and may reconstruct the current motion vector by adding the reconstructed differential motion vector to the predicted motion vector.

Moreover, when the absolute values of the x-component and the y-component of the reconstructed differential motion vector are larger than predetermined thresholds of the x-component and the y-component, respectively, the motion vector reconstructor 1540 may not decode the candidate identification flag and may determine the motion vector prediction candidate, which makes the reconstructed current motion vector has a minimum value, as the predicted motion vector by using each of the one or more motion vector prediction candidates.

As an example with reference to FIG. 8 and FIG. 9, when the differential motion vector is larger than the threshold, in the case where the motion vector reconstructor 1540 may not identify which motion vector prediction candidate among the selected motion vector prediction candidates without the prediction candidate identification flag has been determined as the predicted motion vector, if the current motion vector is reconstructed by the x-component of the first motion vector prediction candidate, the current motion vector is "7" (10−3=7). However, since the x-component of the second motion vector prediction candidate is "7", it may be identified that the current motion vector is not encoded by using the x-component of the first motion vector prediction candidate. If the current motion vector is reconstructed by the x-component of the second motion vector prediction candidate, the current motion vector is "4" (7−3=4). Therefore, when the current motion vector is "4", it identifies that the case predicted by using the x-component of the third motion vector prediction candidate is more optimal than the case predicted by using the x-component of the second motion vector prediction candidate. Accordingly, it can be seen that the current motion vector is not encoded by using the x-component of the second motion vector prediction candidate. Through the above method, it can be seen that the x-component of the third motion vector prediction candidate is optimal and the image encoding apparatus 100 may identify that the x-component of the third motion vector prediction candidate is determined as the x-component of the predicted motion vector.

Further, in the decoder 1410, when the absolute values of the corresponding components of the differential motion vector are larger than the thresholds of the corresponding components, respectively, so that it is not required to decode the prediction candidate identification flag, the predicted motion vector may be determined by separately decoding the motion vector prediction candidates for each of the components. For example, as described above for the encoder 150, when the respective absolute values of the two components of the differential motion vector are all larger than the thresholds of the corresponding components, "A" is determined as the optimal predicted motion vector for the x-component and "B" is determined as the optimal predicted motion vector for the y-component. As a result, different motion vector prediction candidates for each of the components may be determined as the predicted motion vector.

Moreover, when the absolute values of the corresponding components of the differential motion vector are smaller than the thresholds of the corresponding components, respectively or when only one absolute value between the absolute values of the two components is smaller than the corresponding threshold, the decoder 1410 should decode the prediction candidate identification flag. The motion vector reconstructor 1540 may determine the motion vector prediction candidate identified by the prediction candidate identification flag reconstructed by the prediction candidate identification flag decoder 1520 as the motion vector prediction candidate. Further, when the x-component and the y-component of the differential motion vector are all smaller than the thresholds, the motion vector prediction candidate identified by decoding the respective motion vector prediction candidates of the x-component and the y-component may be determined as the predicted motion vector and the motion vector prediction candidate, which is satisfied with the two components at the same time by decoding one prediction candidate identification flag, may be determined as the predicted motion vector. When only one absolute value between the absolute values of the two components of the differential motion vector is larger than the threshold of the corresponding component, the prediction candidate identification flag is decoded only for the component smaller than the threshold of the corresponding component. When one or more absolute values among the absolute values of the x-component and the y-component of the differential motion vector are smaller than or the same as one or more thresholds among predetermined thresholds of the x-component and the y-component, the motion vector reconstructor 1540 may determine one or more components among the x-component and the y-component of the motion vector prediction candidate identified by the prediction candidate identification flag reconstructed by the prediction candidate identification flag decoder 1520 as one or more components among the x-component and the y-component of the predicted motion vector. At this time, when the prediction candidate selection flag decoder 1510 reconstructs the prediction candidate selection flag, the motion vector reconstructor 1540, of course, may determine one or more components among the x-component and the y-component of the motion vector prediction candidate identified by the reconstructed prediction candidate identification flag among the motion vector prediction candidates identified by the prediction candidate selection flag as one or more components among the x-component and the y-component of the predicted motion vector.

For example, when only one component is smaller than the threshold, the prediction candidate identification flag decoder 240 described above through FIG. 2 may generate the prediction candidate identification flag for identifying which motion vector prediction candidate is used as the component larger than the threshold. When both components are not larger than the thresholds, the prediction candidate identification flag decoder 240 may generate and encode one prediction candidate identification flag for identifying which motion vector prediction candidates are used as the two components or generate and encode two prediction candidate identification flags for identifying which motion vector prediction candidates are used as the two components.

Accordingly, when the prediction candidate identification flag decoder 1520 extracts the two encoded prediction candidate identification flags from the bit-stream and decodes the two encoded prediction candidate identification flags extracted from the bit-stream, the motion vector reconstructor 1540 may determine the x-component and the y-component of the motion vector prediction candidate identified by the two prediction candidate identification flags as the x-component and the y-component of the predicted motion vector. Further, when the prediction candidate identification flag decoder 1520 extracts and decodes one encoded prediction candidate identification flag, the motion vector reconstructor 1540 may determine the x-component and the y-component of the motion vector prediction candidate identified by the one prediction candidate identification flag as the x-component and the y-component of the predicted motion vector or determine the x-component or the y-component of the motion vector prediction candidate identified by the one prediction candidate identification flag as the x-component or the y-component of the predicted motion vector.

At this time, the motion vector reconstructor 1540 may determine the component agreed upon by (or predetermined by) the motion vector reconstructor 1540 and the prediction candidate identification flag decoder 240 of the image encoding apparatus 100 as a result of which component between the x-component and the y-component of the motion vector prediction candidate identified by one prediction candidate identification flag should be determined as the corresponding component of the predicted motion vector. Further, when the motion vector reconstructor 1540 determines one component between the x-component and the y-component of the motion vector prediction candidate identified by one prediction candidate identification flag as the corresponding component of the predicted motion vector, the other component, which is not determined, may determine the corresponding component of the motion vector prediction candidate, which makes the current motion vector has a minimum value, reconstructed by using each of the corresponding components of the one or more motion vector prediction candidates as the corresponding component of the predicted motion vector.

Further, when the number of prediction candidates selected by using the motion vector prediction candidates selected in the prediction candidate selection flag decoder 1510 as defined by Equation 7 described for the encoder 150 is N, the N−1 number of thresholds are calculated and the length of the prediction candidate identification flag to decode is changed according to the size of the differential motion vector as shown in FIG. 8 and FIG. 10. The prediction candidate identification flag decoder 1520 generates and decodes different prediction candidate identification flags according to the sizes of the absolute values of each of the components and the thresholds of each of the components. That is, when the absolute values of the corresponding components of the differential motion vector are smaller than or the same as the smallest thresholds of the corresponding components among the N−1 number of thresholds arranged in descending order, respectively, the prediction candidate identification flag decoder 1520 decodes the prediction candidate identification flag for identifying which motion vector prediction candidate among the selected N number of motion vector prediction candidates has been determined as the predicted motion vector. When the absolute values of the corresponding components of the differential motion vector are smaller than or the same as the second smallest thresholds of the corresponding components, respectively, it is supposed that there is no current motion vector between the two motion vector prediction candidates having the smallest thresholds of the corresponding components and the prediction candidate identification flag decoder 1520 decodes the prediction candidate identification flag for identifying which motion vector prediction candidate among the selected N−1 number of motion vector prediction candidates is determined as the predicted motion vector. When the absolute values of the corresponding components of the differential motion vector are smaller than or the same as the third smallest thresholds of the corresponding components, respectively, it is supposed that there is no current motion vector between the two motion vector prediction candidates having the smallest thresholds of the corresponding components and no current vector between the two motion vector prediction candidates having the second smallest thresholds of the corresponding components, and the prediction candidate identification flag decoder 1520 decodes the prediction candidate identification flag for identifying which motion vector prediction candidate among the selected N−2 number of motion vector prediction candidates has been determined as the predicted motion vector.

When the length of the prediction candidate identification flag to be decoded is an integer as defined by Equation 9 as described in the encoder of FIG. 11. When the prediction candidate identification flag is "1" by reading 1 bit, the motion vector prediction candidate having the highest probability is determined. When the prediction candidate identification flag is "0", the motion vector prediction candidate is determined by reading as much as the maximum length of the prediction candidate identification flag as defined by Equation 8. When the value obtained by Equation 9 is not an integer, the motion vector prediction candidate ($MVp\_{Cand}[i]$) is determined by reading the maximum length of the prediction candidate identification flag as defined by Equation 8.

Figure 3:
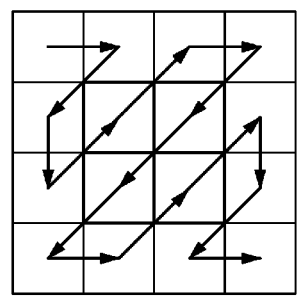
FIG. 3 illustrates an example of a zigzag scan direction.

As an example with reference to FIG. 8 and FIG. 10, the number of motion vector prediction candidates is four and each of the thresholds are "1", "3", and "5". FIG. 3 illustrates sections divided according to the three thresholds. A section indicated by ① represents the x-components of the motion vector prediction candidates, a section indicated by ② represents a section at which the x-component of the current motion vector is located when the absolute value of the x-component of the differential motion vector is smaller than or the same as the smallest threshold of the x-component, a section indicated by ③ represents a section at which the x-component of the current motion vector is located when the absolute value of the x-component of the differential motion vector is smaller than or the same as the second smallest threshold of the x-component, a section indicated by ④ represents a section at which the x-component of the current motion vector is located when the absolute value of the x-component of the differential motion vector is smaller than or the same as the largest threshold of the x-component, and a section indicated by ⑤ represents a section at which the x-component of the current motion vector is located when the absolute value of the x-component of the differential motion vector is larger the largest threshold of the x-component.

The prediction candidate identification flag decoder 1520 decodes the prediction candidate identification flag for identifying which motion vector prediction candidate among the four motion vector prediction candidates is determined as the predicted motion vector in the section indicated by ②, and the prediction candidate identification flag for identifying which motion vector prediction candidate among the three motion vector prediction candidates is determined as the predicted motion vector in the section indicated by ③, the prediction candidate identification flag for identifying which motion vector prediction candidate among the two motion vector prediction candidates is determined as the predicted motion vector in the section indicated by ④, and does not decode the prediction candidate identification flag in the section indicated by ⑤.

When the differential motion vector is "+4", it is larger than the second largest threshold and smaller than the largest threshold so that the above case belongs to the section ④ of FIG. 10 as described for the encoder 150. The prediction candidate identification flag for indicating which motion vector prediction candidate between "4" and "14" is used as the prediction candidate in the encoder 150 is decoded. At this time, since the number of motion vector prediction candidates to decode is two as defined by Equation 8, only 1 bit is decoded. When the differential motion vector is "−3", the case belongs to the section ③ so that the prediction candidate identification flag for indicating which motion vector prediction candidate among "−4", "2", and "14" is used as the prediction candidate in the encoder 150 is decoded. At this time, the number of motion vector prediction candidates to decode is three so that the value obtained by Equation 9 is an integer. When the value obtained by reading only 1 bit is "1", $MVp\_Cand[0]$ is used as the motion vector prediction candidate. When the value is "0", the entire the prediction candidate identification flag to be decoded is decoded as calculated by Equation 8.

Further, when the decoder 1410 further includes the prediction candidate identification flag decoder 1520, the motion vector reconstructor 1540 reads only 1 bit of the prediction candidate identification flag, determines whether the 1 bit is, for example, "1", and then identifies whether the motion vector prediction candidate having the highest probability is determined as the predicted motion vector. Only when the motion vector prediction candidate having the highest probability is not determined as the predicted motion vector, the motion vector reconstructor 1540 additionally reads one or more bits so that the motion vector reconstructor 1540 may identify which motion vector prediction candidate has been determined as the predicted motion vector.

At this time, the motion vector reconstructor 1540 may calculate the probability, by which each of the one or more motion vector prediction candidates is determined as the current motion vector, by encoding one or more areas of the current frame by using the one or more motion vector prediction candidates, and follow a randomly designated and set probability or select a randomly designated and set motion vector prediction candidate as the motion vector prediction candidate having the highest probability.

Figure 16:
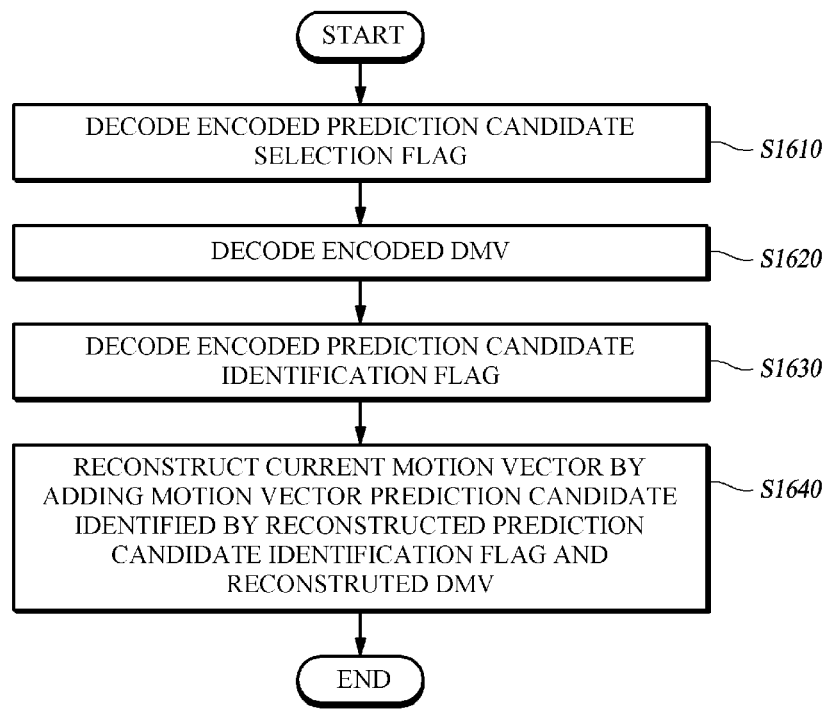
FIG. 16 is a flow chart for describing a motion vector decoding method according to an aspect of the present disclosure.

FIG. 16 is a flow chart for describing a motion vector decoding method according to an aspect of the present disclosure.

The decoder 1410 reconstructs the prediction candidate identification flag by reading and decoding the encoded prediction candidate identification flag included in the bit-stream S1610, reconstructs the differential motion vector by reading and decoding the encoded differential motion vector included in the bit-stream S1620, reconstructs the prediction candidate identification flag by reading and decoding the encoded prediction candidate identification flag included in the bit-stream S1630, and determines the motion vector prediction candidate identified by the prediction candidate identification flag reconstructed in S1630 as the predicted motion vector and reconstructs the current motion vector of the current block by adding the determined predicted motion vector to the differential motion vector reconstructed in S1620 S1640. Here, the decoder 1410 may not perform steps S1610 and S1630. In the case where the decoder 1410 does not perform steps S1610 and S1630, when the decoder 1410 determines the predicted motion vector in step S1640, if there is no prediction candidate identification flag, the decoder 1410 may determine the predicted motion vector according to the method for determining the predicted motion vector as described through FIG. 15. Further, the order of the steps shown in FIG. 16 is only an example so that the present disclosure is not limited to the order and the order may be selectively changed.

Figure 17:
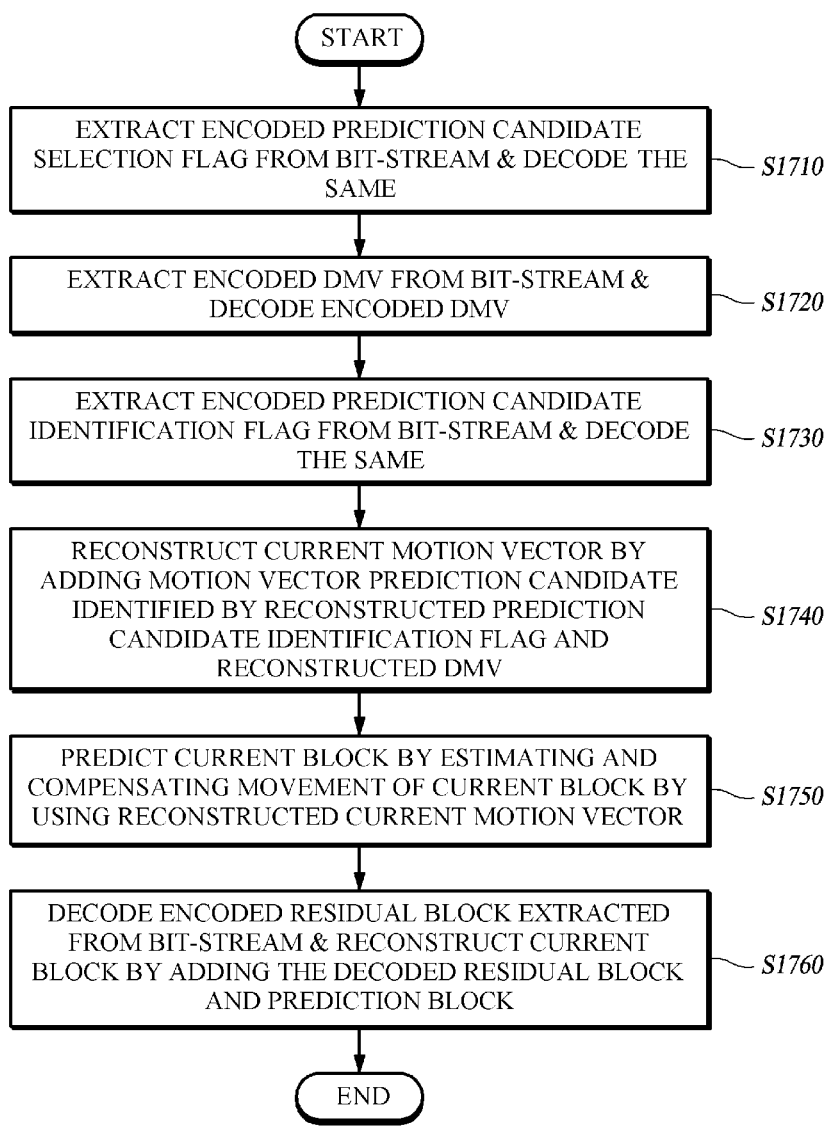
FIG. 17 is a flow chart for describing an image decoding method according to an aspect of the present disclosure.

FIG. 17 is a flow chart for describing an image decoding method according to an aspect of the present disclosure.

The image decoding apparatus 1400 reconstructs the prediction candidate identification flag by extracting the encoded prediction candidate identification flag from the bit-stream and decoding the encoded prediction candidate identification flag extracted from the bit-stream S1710, reconstructs the differential motion vector by extracting the encoded differential motion vector from the bit-stream and decoding the encoded differential motion vector extracted from the bit-stream S1720, reconstructs the prediction candidate identification flag by extracting the encoded prediction candidate identification flag from the bit-stream and decoding the encoded prediction candidate identification flag extracted from the bit-stream S1730, and determines in step S1740 the motion vector prediction candidate identified by the prediction candidate identification flag reconstructed in step S1730 as the predicted motion vector and reconstructs the current motion vector of the current block by adding the determined predicted motion vector to the differential motion vector reconstructed in step S1720.

The image decoding apparatus 1400 predicts the current block by estimating and compensating the movement of the current block by using the current motion vector reconstructed in step S1740, and then generates the predicted block S1750. The image decoding apparatus 1400 reconstructs the encoded residual block by extracting the encoded residual block from the bit-stream and decoding the encoded residual block extracted from the bit-stream by dequantizing and inversely transforming the residual block, and then reconstructs the current block by adding the reconstructed residual block to the predicted block S1760.

Here, the image decoding apparatus 1400 may not perform steps S1710 and S1730. In the case where the image decoding apparatus 1400 does not perform steps S1710 and S1730, when the image decoding apparatus 1400 determines the predicted motion vector in step S1740, if there is no prediction candidate identification flag, the image decoding apparatus 1400 may determine the predicted motion vector according to the method for determining the predicted motion vector as described through FIG. 15. Further, the order of the steps shown in FIG. 17 is only an example so that the present disclosure is not limited to the order and the order may be selectively changed.

For example, the image decoding apparatus 1400 does not perform steps according the order shown in FIG. 17, but the image decoding apparatus 1400 may perform steps according to the following order. The order is as follows. The image decoding apparatus 1400 reconstructs the residual block by extracting the encoded residual block from the bit-stream and decoding the encoded residual block extracted from the bit-stream, reconstructs the differential motion vector by extracting the encoded differential motion vector from the bit-stream and decoding the encoded differential motion vector extracted from the bit-stream, selects one or more motion vector prediction candidates among one or more motion vector prediction candidates as the predicted motion vector and reconstructs the current motion vector of the current block by using the selected predicted motion vector and the reconstructed differential motion vector, dequantizes the reconstructed residual block and inversely transforms the dequantized residual block, and generates the predicted block by using the reconstructed current motion vector and reconstructs the current block by adding the inversely transformed residual block to the generated predicted block.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

As described above, some embodiments of the present disclosure improve the efficiency by reducing the bit amount to encode information of the predicted motion vector while encoding the motion vector by using the predicted motion vector more accurately predicted.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have not been described for limiting purposes. Accordingly, the scope of the claimed invention is not to be limited by the above embodiments but by the claims and the equivalents thereof.

What is claimed is:

1. An apparatus for decoding a current motion vector of a current block in a current frame from a bitstream by determining a predicted motion vector corresponding to the current motion vector of the current block, the apparatus comprising:
   a differential motion vector decoder configured to reconstruct a differential motion vector by decoding an encoded differential motion vector included in the bitstream;
   a motion vector reconstructor configured to:
      select one or more motion vector prediction candidates to determine the predicted motion vector corresponding to the current motion vector,
      determine the predicted motion vector among the one or more motion vector prediction candidates, and
      reconstruct the current motion vector of the current block by adding the predicted motion vector to the differential motion vector, and
   a prediction candidate identification flag decoder configured to reconstruct a prediction candidate identification flag by decoding an encoded prediction candidate identification flag,
   wherein the motion vector reconstructor is configured to determine a motion vector prediction candidate identified by the prediction candidate identification flag among the one or more motion vector prediction candidates to be the predicted motion vector, and
   wherein the motion vector reconstructor comprises:
      means for selecting one or more of first motion vector prediction candidates from one or more adjacent blocks of the current block in the current frame, and
      means for selecting a second motion vector prediction candidate from a block in a reference frame other than the current frame, wherein a position of the block in the reference frame is derived based on a position of the current block in the current frame.

2. The apparatus of claim 1, wherein the motion vector reconstructor is configured to select the one or more of first motion vector prediction candidates from at least one of the adjacent blocks located at an upper left side, an upper side or an upper right side of the current block.

3. The apparatus of claim 1, wherein the motion vector reconstructor is configured to select the second motion vector prediction candidate from the block in the reference frame which is at a same position with the current block or neighboring to the same position with the current block.

4. The apparatus of claim 1, wherein the motion vector reconstructor is configured to select only one motion vector prediction candidate among two of motion vector prediction candidates which are within a preset distance.

5. The apparatus of claim 1, wherein the prediction candidate identification flag decoder is configured to decode a part of bits included in a bit-stream by the prediction candidate identification flag,
   the motion vector reconstructor is configured to determine the motion vector prediction candidate identified as the predicted motion vector when the motion vector prediction candidate having the highest probability to be determined as the current motion vector is identified, and
   the prediction candidate identification flag decoder is configured to decode additional bits included in the bit-stream when the motion vector prediction candidate having the highest probability to be determined as the current motion vector is not identified.

6. The apparatus of claim 1, further comprising
a prediction candidate selection flag decoder configured to reconstruct a prediction candidate selection flag by decoding an encoded prediction candidate selection flag.

7. The apparatus of claim 6, wherein the motion vector reconstructor is configured to determine a motion vector prediction candidate identified by the prediction candidate selection flag having been reconstructed, as the one or more motion vector prediction candidates.

8. The apparatus of claim 1, wherein the motion vector reconstructor is configured to select the one or more motion vector prediction candidates either among the one or more of first motion vector prediction candidates or among the second motion vector prediction candidate.

9. The apparatus of claim 1, wherein the motion vector reconstructor is configured to select one of the first motion vector prediction candidates from upper blocks adjacent to the current block, and one of the first motion vector prediction candidates from left blocks adjacent to the current block.

10. A method performed by an apparatus for decoding a current motion vector of a current block in a current frame from a bitstream by determining a predicted motion vector corresponding to the current motion vector of the current block, the method comprising:
    decoding an encoded differential motion vector included in the bitstream, to reconstruct a differential motion vector;
    selecting one or more motion vector prediction candidates to determine the predicted motion vector corresponding to the current motion vector;
    determining the predicted motion vector among the one or more motion vector prediction candidates; and
    reconstructing the current motion vector of the current block by adding the predicted motion vector to the differential motion vector,
    wherein the selecting of the one or more motion vector prediction candidates comprises:
        selecting one or more of first motion vector prediction candidates from one or more adjacent blocks of the current block in the current frame, and
        selecting a second motion vector prediction candidate from a block in a reference frame other than the current frame, wherein a position of the block in the reference frame is derived based on a position of the current block in the current frame, and
    wherein the determining of the predicted motion vector comprising:
        decoding an encoded prediction candidate identification flag to reconstruct a prediction candidate identification flag, and
        determining a motion vector prediction candidate identified by the prediction candidate identification flag among the one or more motion vector prediction candidates to be the predicted motion vector.

11. The method of claim 10, wherein the one or more of first motion vector prediction candidates are selected from at least one of the adjacent blocks located at an upper left side, an upper side or an upper right side of the current block.

12. The method of claim 10, wherein the second motion vector prediction candidate is selected from the block in the reference frame which is at a same position with the current block or neighboring to the same position with the current block.

13. The method of claim 10, wherein the selecting one or more motion vector prediction candidates comprising:
    selecting only one motion vector prediction candidate among two of motion vector prediction candidates which are within a preset distance.

14. The method of claim 10, wherein the selecting one or more of the first motion vector prediction candidates comprises:
    selecting one of the first motion vector prediction candidates from left blocks adjacent to the current block, or
    selecting one of the first motion vector prediction candidates from upper blocks adjacent to the current block.

\* \* \* \* \*